(12) United States Patent
Cheng et al.

(10) Patent No.: US 9,736,841 B2
(45) Date of Patent: Aug. 15, 2017

(54) DATA TRANSMISSION METHOD, BASE STATION AND USER EQUIPMENT

(71) Applicant: Huawei Technologies Co., Ltd., Shenzhen (CN)

(72) Inventors: Yan Cheng, Shenzhen (CN); Lixia Xue, Shenzhen (CN); Bo Li, Shenzhen (CN); Lei Guan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 112 days.

(21) Appl. No.: 14/671,737

(22) Filed: Mar. 27, 2015

(65) Prior Publication Data
US 2015/0237629 A1 Aug. 20, 2015

Related U.S. Application Data

(63) Continuation of application No. PCT/CN2012/082366, filed on Sep. 28, 2012.

(51) Int. Cl.
*H04W 72/04* (2009.01)

(52) U.S. Cl.
CPC ... *H04W 72/0453* (2013.01); *H04W 72/0406* (2013.01); *H04W 72/0446* (2013.01)

(58) Field of Classification Search
CPC .................. H04W 72/0453; H04W 72/0446
See application file for complete search history.

(56) References Cited

U.S. PATENT DOCUMENTS

| 8,611,238 | B2* | 12/2013 | Papasakellariou .... H04L 5/0037 370/252 |
| 2012/0044896 | A1* | 2/2012 | Kwon .................. H04L 1/1854 370/329 |

(Continued)

FOREIGN PATENT DOCUMENTS

| CN | 101883406 A | 11/2010 |
| CN | 102387525 A | 3/2012 |

(Continued)

OTHER PUBLICATIONS

"On X2 signaling for TDM eICIC in Macro+Pico scenarios," 3GPP TSG RAN WG3 #70 Meeting, Jacksonville, Florida, R3-103555, 3rd Generation Partnership Project, Valbonne, France (Nov. 15-19, 2010).

(Continued)

*Primary Examiner* — Khaled Kassim
*Assistant Examiner* — Syed S Ali
(74) *Attorney, Agent, or Firm* — Leydig, Voit & Mayer, Ltd.

(57) ABSTRACT

Embodiments of the present disclosure provide a data transmission method, a base station and user equipment. The method includes: sending, by a first base station, first information to a second base station, or receiving, by the first base station, the first information sent by the second base station, wherein the first information is used for indicating that the second base station is to serve user equipment; sending, by the first base station, second information to the user equipment, wherein the second information is used for instructing the user equipment to operate on a carrier corresponding to the second base station, for enabling the user equipment to operate on the carrier corresponding to the second base station. By adopting the embodiments of the present disclosure, the probability of wrong scheduling of (Continued)

high-capacity user equipment is reduced, and the performance loss caused by wrong scheduling is avoided.

7 Claims, 15 Drawing Sheets

(56) References Cited

U.S. PATENT DOCUMENTS

| | | | | |
|---|---|---|---|---|
| 2012/0120888 A1* | 5/2012 | Miao | H04B 1/7143 | 370/329 |
| 2012/0202554 A1* | 8/2012 | Seo | H04W 52/146 | 455/522 |
| 2013/0077599 A1* | 3/2013 | Dimou | H04W 36/22 | 370/331 |
| 2013/0107826 A1* | 5/2013 | Dinan | H04W 16/32 | 370/329 |
| 2013/0223258 A1* | 8/2013 | Seo | H04W 24/02 | 370/252 |
| 2013/0303199 A1* | 11/2013 | Siomina | H04W 64/00 | 455/456.5 |
| 2013/0315115 A1* | 11/2013 | Kim | H04J 11/0056 | 370/280 |
| 2014/0219131 A1* | 8/2014 | Yang | H04W 24/10 | 370/252 |
| 2014/0307696 A1* | 10/2014 | Choi | H04L 1/0038 | 370/329 |
| 2015/0155993 A1* | 6/2015 | Berggren | H04L 5/0023 | 370/330 |
| 2015/0181534 A1* | 6/2015 | Andersson | H04L 1/0015 | 370/311 |
| 2015/0215926 A1* | 7/2015 | Huang | H04W 36/0061 | 370/329 |

FOREIGN PATENT DOCUMENTS

| | | | |
|---|---|---|---|
| CN | 102685796 A | 9/2012 | |
| EP | 2249601 A2 | 11/2010 | |
| EP | 2560436 A2 | 2/2013 | |
| GB | 2472789 A | 2/2011 | |
| JP | EP 2249601 A2 * | 11/2010 | H04W 36/02 |
| WO | WO 2011129598 A2 | 10/2011 | |
| WO | WO 2012113449 A1 | 8/2012 | |

OTHER PUBLICATIONS

"Blank Subframes for LTE," 3GPP TSG RAN WG1 Meeting #58, Shenzhen, China, R1-093340, 3rd Generation Partnership Project, Valbonne, France (Aug. 24-28, 2009).

"Discussion on time domain eICIC solutions in TDD system," 3GPP TSG-RAN WG1 #62, Madrid Spain, R1-104367, pp. 1-6, 3rd Generation Partnership Project, Valbonne, France (Aug. 23-27, 2010).

"Details of Time-domain Extension of Rel-8/9 Backhaul-Based ICIC for Macro-Pico Case," 3GPP TSG RAN WG1 Meeting #62bis, Xi'an, P.R. China, R1-105214, 3rd Generation Partnership Project, Valbonne, France (Oct. 11-15, 2010).

* cited by examiner

DATA TRANSMISSION METHOD, BASE STATION AND USER EQUIPMENT

CROSS-REFERENCE TO RELATED APPLICATIONS

This application is a continuation of International Patent Application No. PCT/CN2012/082366, filed on Sep. 28, 2012 which is hereby incorporated by reference in its entirety.

FIELD OF THE DISCLOSURE

The present disclosure relates to the field of communications, and more particularly, to a data transmission method, a base station and user equipment.

BACKGROUND OF THE DISCLOSURE

A long term evolution-advanced (referred to as "LTE-A") system is a further evolution and enhancement system of a 3rd generation partnership project (referred to as "3GPP") long term evolution (referred to as "LTE") system. In the LTE-A system, in order to meet the requirements of International Telecommunication Union on the peak data rate of the fourth generation communication technology, carrier aggregation (referred to as "CA") technology, also known as spectrum aggregation technology or bandwidth extension technology, is introduced. In carrier aggregation, the frequency spectrums of two or more component carriers are aggregated together to obtain a wider transmission bandwidth, and the frequency spectrums of the component carriers may be adjacent continuous frequency spectrums and may also be non-adjacent frequency spectrums in the same frequency band and even discontinuous frequency spectrums in different frequency bands; LTE Rel-8/9 user equipment (referred to as "UE") may access only one component carrier to receive and send data, while the LTE-A user equipment may simultaneously access multiple component carriers according to the capacity and service demand thereof to receive and send data.

In any one of the existing carrier aggregation systems, only the carriers under the same base station are aggregated together. In a subsequent evolved LTE system, carrier aggregation between base stations will be introduced; at this time, non-ideal retransmission is performed between the base stations, and real-time data transmission could not be achieved between the base stations. A type of low-capacity user equipment may exist in the above-mentioned system of carrier aggregation between base stations, and the type of low-capacity user equipment could not simultaneously operate on carriers corresponding to multiple base stations, and may only operate on the carrier corresponding to one base station at each moment. Although high-capacity user equipment may operate in the above-mentioned system of multi-carrier aggregation between base stations, it may generate a wrong scheduling condition, since the data scheduling of multiple downlink carriers is independently performed by each base station.

SUMMARY OF THE DISCLOSURE

Embodiments of the present disclosure provide a data transmission method, a base station and user equipment, which may be used for enabling user equipment which can not simultaneously operate in cells corresponding to two base stations operate in a time-sharing manner in a system of multi-carrier polymerization between the base stations, reducing the probability of wrong scheduling of high-capacity user equipment and avoiding the performance loss caused by wrong scheduling.

In the first aspect, a data transmission method is provided, including:

sending, by a first base station, first information to a second base station, or receiving, by the first base station, the first information sent by the second base station, wherein the first information is used for indicating that the second base station is to serve user equipment; and sending, by the first base station, second information to the user equipment, wherein the second information is used for instructing the user equipment to operate on a carrier corresponding to the second base station, for enabling the user equipment to operate on the carrier corresponding to the second base station after the user equipment receives the second information.

In combination with the first aspect, in the first possible implementation manner of the first aspect, the first base station and the second base station interact with the user equipment by means of different carriers, and the first base station and the second base station have different divisions of labor for the user equipment.

In combination with the first aspect or the first possible implementation manner of the first aspect, in the second possible implementation manner of the first aspect, the method further includes:

sending, by the first base station, third information to the user equipment, wherein the third information is used for instructing the user equipment to operate on a carrier corresponding to the first base station, for enabling the user equipment to operate on the carrier corresponding to the first base station on a particular sub-frame, and continue to operate on the carrier corresponding to the first base station after the third information is detected.

In combination with the second possible implementation manner of the first aspect, in the third possible implementation manner of the first aspect, before that the user equipment operates on the carrier corresponding to the first base station on the particular sub-frame, the method further includes:

sending, by the first base station, information used for indicating the particular sub-frame to the user equipment, for enabling the user equipment to operate on the carrier corresponding to the first base station on the particular sub-frame according to the information used for indicating the particular sub-frame.

In combination with the second possible implementation manner of the first aspect or the third possible implementation manner of the first aspect, in the fourth possible implementation manner of the first aspect, before that the user equipment operates on the carrier corresponding to the first base station on the particular sub-frame, the method further includes:

sending, by the first base station, information used for indicating the particular sub-frame to the second base station, for enabling the second base station not to send data to the user equipment on the particular sub-frame according to the information used for indicating the particular sub-frame.

In combination with the first aspect or the first possible implementation manner of the first aspect, in the fifth possible implementation manner of the first aspect, when the first information is sent by the second base station to the first base station, the receiving, by the first base station, the first information sent by the second base station, includes:

receiving, by the first base station, the first information sent by the second base station after the second base station determines that a downlink semi-persistent scheduling service needs to be sent to the user equipment.

In combination with the first aspect or the first possible implementation manner of the first aspect, in the sixth possible implementation manner of the first aspect, when the first information is sent by the first base station to the second base station, before the sending, by first base station, first information to a second base station, the method further includes:

receiving, by the first base station, fourth information sent by the user equipment after the user equipment determines that an uplink semi-persistent scheduling service needs to be sent to the second base station, wherein the fourth information is used for requesting for operating on the carrier corresponding to the second base station.

In combination with the second possible implementation manner of the first aspect, the third possible implementation manner of the first aspect or the fourth possible implementation manner of the first aspect, in the seventh possible implementation manner of the first aspect, the first base station is a macro base station, and the second base station is a micro base station.

In combination with the fifth possible implementation manner of the first aspect or the sixth possible implementation manner of the first aspect, in the eighth possible implementation manner of the first aspect, the first base station is a micro base station, and the second base station is a macro base station.

In the second aspect, a data transmission method is provided, including:

receiving, by a second base station, first information sent by a first base station, or sending, by the second base station, the first information to the first base station, wherein the first information is used for indicating that the second base station is to serve user equipment; and serving, by the second base station, the user equipment based on the first information.

In combination with the second aspect, in the first possible implementation manner of the second aspect, the first base station and the second base station interact with the user equipment by means of different carriers, and the first base station and the second base station have different divisions of labor for the user equipment.

In combination with the second aspect or the first possible implementation manner of the second aspect, in the second possible implementation manner of the second aspect, the method further includes:

receiving, by the second base station, information used for indicating a particular sub-frame and sent by the first base station; and not sending, by the second base station, data to the user equipment on the particular sub-frame indicated by the information used for indicating the particular sub-frame, according to the information used for indicating the particular sub-frame.

In combination with the first possible implementation manner of the second aspect or the second possible implementation manner of the second aspect, in the third possible implementation manner of the second aspect, the method further includes:

receiving, by the second base station, fifth information sent by the user equipment when the user equipment operates on the carrier corresponding to the second base station on a non-particular sub-frame after the user equipment detects no third information on the carrier corresponding to the first base station on the particular sub-frame, wherein the third information is used for instructing the user equipment to operate on the carrier corresponding to the first base station, and the fifth information is used for requesting the second base station to serve the user equipment; and serving, by the second base station, the user equipment based on the fifth information.

In combination with the second aspect or the first possible implementation manner of the second aspect, in the fourth possible implementation manner of the second aspect, when the first information is sent by the second base station to the first base station, before the sending, by the second base station, the first information to the first base station, the method further includes:

determining, by the second base station, that a downlink semi-persistent scheduling service needs to be sent to the user equipment.

In combination with the fourth possible implementation manner of the second aspect, in the fifth possible implementation manner of the second aspect, the serving, by the second base station, the user equipment, includes:

sending, after k sub-frames after the first information is sent, physical downlink control channel signaling used for triggering a semi-persistent service of the user equipment to the user equipment, wherein the k is not smaller than 8+t, and the t is an integer greater than or equal to 5.

In combination with the second aspect or the first possible implementation manner of the second aspect, in the sixth possible implementation manner of the second aspect, when the first information is sent by the first base station to the second base station, the receiving, by a second base station, first information sent by a first base station, includes:

receiving, by the second base station, the first information sent by the first base station after the first base station receives the fourth information sent by the user equipment, wherein the fourth information is sent by the user equipment to the first base station when the user equipment determines that an uplink semi-persistent scheduling service needs to be sent to the second base station, and the fourth information is used for requesting for operating on the carrier corresponding to the second base station.

In combination with the second possible implementation manner of the second aspect or the third possible implementation manner of the second aspect, in the seventh possible implementation manner of the second aspect, the second base station is a micro base station, and the first base station is a macro base station.

In combination with the fourth possible implementation manner of the second aspect, the fifth possible implementation manner of the second aspect or the sixth possible implementation manner of the second aspect, in the eighth possible implementation manner of the second aspect, the second base station is a macro base station, and the first base station is a micro base station.

In the third aspect, a data transmission method is provided, including:

receiving, by user equipment, second information sent by a first base station, wherein the second information is used for instructing the user equipment to operate on a carrier corresponding to the second base station; wherein the first base station also sends first information to the second base station, or the second information is sent by the first base station after the first base station receives the first information sent by the second base station, and the first information is used for indicating that the second base station is to serve the user equipment; and operating, by the user equipment, on the carrier corresponding to the second base station based on the second information.

In combination with the third aspect, in the first possible implementation manner of the third aspect, the first base station and the second base station interact with the user equipment by means of different carriers, and the first base station and the second base station have different divisions of labor for the user equipment.

In combination with the third aspect or the first possible implementation manner of the third aspect, in the second possible implementation manner of the third aspect, the method further includes:

operating, by the user equipment, on the carrier corresponding to the first base station on a particular sub-frame, and detecting whether third information sent by the first base station exists, wherein the third information is used for instructing the user equipment to operate on the carrier corresponding to the first base station; and continuing, by the user equipment, to operate on the carrier corresponding to the first base station, if the third information exists.

In combination with the second possible implementation manner of the third aspect, in the third possible implementation manner of the third aspect, the method further includes:

operating, by the user equipment, on the carrier corresponding to the second base station on a non-particular sub-frame, if the third information does not exist; and sending, by the user equipment, fifth information to the second base station, wherein the fifth information is used for requesting the second base station to serve the user equipment.

In combination with the second possible implementation manner of the third aspect or the third possible implementation manner of the third aspect, in the fourth possible implementation manner of the third aspect, before the operating, by the user equipment, on the carrier corresponding to the first base station on a particular sub-frame, the method further includes:

receiving information used for indicating the particular sub-frame and sent by the first base station.

In combination with the third aspect or the first possible implementation manner of the third aspect, in the fifth possible implementation manner of the third aspect, the first information is sent by the first base station to the second base station; and before the receiving, by user equipment, second information sent by a base station, the method further includes:

determining, by the user equipment, that an uplink semi-persistent scheduling service needs to be sent to the second base station; and sending, by the user equipment, fourth information to the first base station, wherein the fourth information is used for requesting for operating on a carrier corresponding to the second base station.

In combination with the second possible implementation manner of the third aspect, the third possible implementation manner of the third aspect or the fourth possible implementation manner of the third aspect, in the sixth possible implementation manner of the third aspect, the first base station is a macro base station, and the second base station is a micro base station.

In combination with the fifth possible implementation manner of the third aspect, in the seventh possible implementation manner of the third aspect, the first base station is a micro base station, and the second base station is a macro base station.

In the fourth aspect, a base station is provided, including:

a transceiving unit, configured to send first information to a second base station, or receive the first information sent by the second base station, wherein the first information is used for indicating that the second base station is to serve user equipment; and a first sending unit, configured to send second information to the user equipment, wherein the second information is used for instructing the user equipment to operate on a carrier corresponding to the second base station, for enabling the user equipment to operate on the carrier corresponding to the second base station after the user equipment receives the second information.

In combination with the fourth aspect, in the first possible implementation manner of the fourth aspect, the base station and the second base station interact with the user equipment by means of different carriers, and the base station and the second base station have different divisions of labor for the user equipment.

In combination with the fourth aspect or the first possible implementation manner of the fourth aspect, in the second possible implementation manner of the fourth aspect, the base station further includes:

a second sending unit, configured to send third information to the user equipment, wherein the third information is used for instructing the user equipment to operate on a carrier corresponding to the base station, for enabling the user equipment to operate on the carrier corresponding to the base station on a particular sub-frame and continue to operate on the carrier corresponding to the base station after the third information is detected.

In combination with the second possible implementation manner of the fourth aspect, in the third possible implementation manner of the fourth aspect, the base station further includes:

a third sending unit, configured to send information used for indicating the particular sub-frame to the user equipment, for enabling the user equipment to operate on the carrier corresponding to the base station on the particular sub-frame according to the information used for indicating the particular sub-frame.

In combination with the second possible implementation manner of the fourth aspect or the third possible implementation manner of the fourth aspect, in the fourth possible implementation manner of the fourth aspect, the base station further includes:

a fourth sending unit, configured to send information used for indicating the particular sub-frame to the second base station, for enabling the second base station not to send data to the user equipment on the particular sub-frame according to the information used for indicating the particular sub-frame.

In combination with the fourth aspect or the first possible implementation manner of the fourth aspect, in the fifth possible implementation manner of the fourth aspect, when the first information is sent by the second base station to the base station, the transceiving unit is specifically configured to:

receive the first information sent by the second base station after the second base station determines that a downlink semi-persistent scheduling service needs to be sent to the user equipment.

In combination with the fourth aspect or the first possible implementation manner of the fourth aspect, in the sixth possible implementation manner of the fourth aspect, when the first information is sent by the base station to the second base station, the base station further includes:

a receiving unit, configured to receive fourth information sent by the user equipment after the user equipment determines that an uplink semi-persistent scheduling service needs to be sent to the second base station, wherein the fourth information is used for requesting for operating on the carrier corresponding to the second base station; and the transceiving unit is specifically configured to send the first information to the second base station according to the fourth information received by the receiving unit.

In combination with the second possible implementation manner of the fourth aspect, the third possible implementation manner of the fourth aspect or the fourth possible implementation manner of the fourth aspect, in the seventh possible implementation manner of the fourth aspect, the base station is a macro base station, and the second base station is a micro base station.

In combination with the fifth possible implementation manner of the fourth aspect or the sixth possible implementation manner of the fourth aspect, in the eighth possible implementation manner of the fourth aspect, the base station is a micro base station, and the second base station is a macro base station.

In the fifth aspect, a base station is provided, including:

a transceiving unit, configured to receive first information sent by a first base station, or send the first information to the first base station, wherein the first information is used for indicating that the base station is to serve user equipment; and a serving unit, configured to serve the user equipment based on the first information.

In combination with the fifth aspect, in the first possible implementation manner of the fifth aspect, the first base station and the base station interact with the user equipment by means of different carriers, and the first base station and the base station have different divisions of labor for the user equipment.

In combination with the fifth aspect or the first possible implementation manner of the fifth aspect, in the second possible implementation manner of the fifth aspect, the base station further includes:

a first receiving unit, configured to receive information used for indicating a particular sub-frame and sent by the first base station;

and the serving unit is specifically configured to send no data to the user equipment on the particular sub-frame indicated by the information used for indicating the particular sub-frame, according to the information used for indicating the particular sub-frame.

In combination with the first possible implementation manner of the fifth aspect or the second possible implementation manner of the fifth aspect, in the third possible implementation manner of the fifth aspect, the base station further includes:

a second receiving unit, configured to receive fifth information sent by the user equipment when the user equipment operates on the carrier corresponding to the base station on a non-particular sub-frame after the user equipment detects no third information when operating on the carrier corresponding to the first base station on the particular sub-frame, wherein the third information is used for instructing the user equipment to operate on the carrier corresponding to the first base station, and the fifth information is used for requesting the base station to serve the user equipment;

and the serving unit is specifically configured to serve the user equipment based on the fifth information.

In combination with the fifth aspect or the first possible implementation manner of the fifth aspect, in the fourth possible implementation manner of the fifth aspect, when the first information is sent by the base station to the first base station, the base station further includes:

a determining unit, configured to determine that a downlink semi-persistent scheduling service needs to be sent to the user equipment;

wherein the transceiving unit is specifically configured to send the first information to the first base station after the determining unit determines that the downlink semi-persistent scheduling service needs to be sent to the user equipment.

In combination with the fourth possible implementation manner of the fifth aspect, in the fifth possible implementation manner of the fifth aspect, the serving unit is specifically configured to:

after k sub-frames after the first information is sent, sending physical downlink control channel signaling used for triggering a semi-persistent service of the user equipment to the user equipment, wherein the k is not smaller than 8+t, and the t is an integer greater than or equal to 5.

In combination with the fifth aspect or the first possible implementation manner of the fifth aspect, in the sixth possible implementation manner of the fifth aspect, when the first information is sent by the first base station to the base station, the transceiving unit is specifically configured to:

receive the first information sent by the first base station after the first base station receives the fourth information sent by the user equipment, wherein the fourth information is sent by the user equipment to the first base station when the user equipment determines that an uplink semi-persistent scheduling service needs to be sent to the base station, and the fourth information is used for requesting for operating on the carrier corresponding to the base station.

In combination with the second possible implementation manner of the fifth aspect or the third possible implementation manner of the fifth aspect, in the seventh possible implementation manner of the fifth aspect, the base station is a micro base station, and the first base station is a macro base station.

In combination with the fourth possible implementation manner of the fifth aspect, the fifth possible implementation manner of the fifth aspect or the sixth possible implementation manner of the fifth aspect, in the eighth possible implementation manner of the fifth aspect, the base station is a macro base station, and the first base station is a micro base station.

In the sixth aspect, user equipment is provided, including:

a first receiving unit, configured to receive second information sent by a first base station, wherein the second information is used for instructing the user equipment to operate on a carrier corresponding to the second base station; wherein the first base station also sends first information to the second base station, or the second information is sent by the first base station after the first base station receives the first information sent by the second base station, and the first information is used for indicating that the second base station is to serve the user equipment; and a first operating unit, configured to operate on the carrier corresponding to the second base station based on the second information.

In combination with the sixth aspect, in the first possible implementation manner of the sixth aspect, the first base station and the second base station interact with the user equipment by means of different carriers, and the first base station and the second base station have different divisions of labor for the user equipment.

In combination with the sixth aspect or the first possible implementation manner of the sixth aspect, in the second possible implementation manner of the sixth aspect, the user equipment further includes:

a second operating unit, configured to operate on a carrier corresponding to the first base station on a particular sub-frame, detect whether third information sent by the first base station exists, and continue to operate on the carrier corresponding to the first base station if the third information exists, wherein the third information is used for instructing the user equipment to operate on the carrier corresponding to the first base station.

In combination with the second possible implementation manner of the sixth aspect, in the third possible implementation manner of the sixth aspect, the second operating unit is further configured to operate on the carrier corresponding to the second base station on a non-particular sub-frame if the third information does not exists;

and the user equipment further includes: a first sending unit, configured to send fifth information to the second base station, wherein the fifth information is used for requesting the second base station to serve the user equipment.

In combination with the second possible implementation manner of the sixth aspect or the third possible implementation manner of the sixth aspect, in the fourth possible implementation manner of the sixth aspect, the user equipment further includes:

a second receiving unit, configured to receive information used for indicating the particular sub-frame and sent by the first base station;

and the second operating unit is specifically configured to operate on the carrier corresponding to the first base station on the particular sub-frame according to the information used for indicating the particular sub-frame, and detect whether the third information sent by the first base station exists, and continue to operate by the user equipment on the carrier corresponding to the first base station if the third information exists, wherein the third information is used for instructing the user equipment to operate on the carrier corresponding to the first base station.

In combination with the sixth aspect or the first second possible implementation manner of the sixth aspect, in the fifth possible implementation manner of the sixth aspect, the first information is sent by the first base station to the second base station; the user equipment further includes: a determining unit, configured to determine that an uplink semi-persistent scheduling service needs to be sent to the second base station; and a second sending unit, configured to send fourth information to the first base station, wherein the fourth information is used for requesting for operating on the carrier corresponding to the second base station.

In combination with the second possible implementation manner of the sixth aspect, the third possible implementation manner of the sixth aspect or the fourth possible implementation manner of the sixth aspect, in the sixth possible implementation manner of the sixth aspect, the first base station is a macro base station, and the second base station is a micro base station.

In combination with the fifth possible implementation manner of the sixth aspect, in the seventh possible implementation manner of the sixth aspect, the first base station is a micro base station, and the second base station is a macro base station.

Therefore, in the embodiments of the present disclosure, the first base station sends the first information to the second base station, or the first base station receives the first information sent by the second base station, wherein the first information is used for indicating that the second base station is to serve the user equipment; the first base station sends the second information to the user equipment, wherein the second information is used for instructing the user equipment to operate on the carrier corresponding to the second base station, for enabling the user equipment to operate on the carrier corresponding to the second base station after the user equipment receives the second information. Accordingly, the user equipment which can not operates simultaneously in cells corresponding to two base stations may operate in a time-sharing manner in a system of multi-carrier polymerization between the base stations, and the time of the user equipment operating in the corresponding cells of the two base stations may be dynamically determined according to actual demand, in order to avoid the problem of reduced user service quality induced when the user equipment operates in a static time-sharing manner; for high-capacity user equipment, due to the interaction between the base stations, the wrong scheduling probability is reduced, and the performance loss caused by wrong scheduling is avoided.

BRIEF DESCRIPTION OF THE DRAWINGS

To illustrate technical solutions in the embodiments of the present disclosure more clearly, a brief introduction on the accompanying drawings which are needed in the description of the embodiments or the prior art is given below. Apparently, the accompanying drawings in the description below are merely some of the embodiments of the present disclosure, based on which other drawings may be obtained by those of ordinary skills in the art without any creative effort.

DETAILED DESCRIPTION OF THE EMBODIMENTS

A clear and complete description of technical solutions in the embodiments of the present disclosure will be given below, in combination with the accompanying drawings in the embodiments of the present disclosure. Apparently, the embodiments described below are merely a part, but not all, of the embodiments of the present disclosure. All of the other embodiments, obtained by those of ordinary skills in the art based on the embodiments of the present disclosure without any creative effort, fall into the protection scope of the present disclosure.

The technical solutions of the present disclosure may be applied to various communication systems, for example: a global system of mobile communication (referred to as "GSM"), a code division multiple access (referred to as "CDMA") system, a wideband code division multiple access (referred to as "WCDMA") system, a general packet radio service ("GPRS"), a long term evolution (referred to as "LTE") system, an LTE frequency division duplex (referred to as "FDD") system, an LTE time division duplex (referred to as "TDD"), a universal mobile telecommunication system (referred to as "UMTS") or the like.

User equipment (referred to as "UE") may also be called a terminal, and may communicate with one or multiple core networks through a radio access network (e.g., referred to as "RAN").

In the embodiments of the present disclosure, a base station may be a base transceiver station (referred to as "BTS") in GSM or CDMA, may also be a base station (NodeB, referred to as "NB") in WCDMA, may also be an evolutional base station (Evolutional Node B, referred to as "eNB or e-NodeB") in LTE and is not limited in the present disclosure.

It should be understood that, when such ordinal numerals as "first", "second", "third", "fourth" and "fifth" or the like are mentioned in the present disclosure, unless really expressing the meaning of sequence according to the context, they should be understood as simply performing a distinction function.

Figure 1:
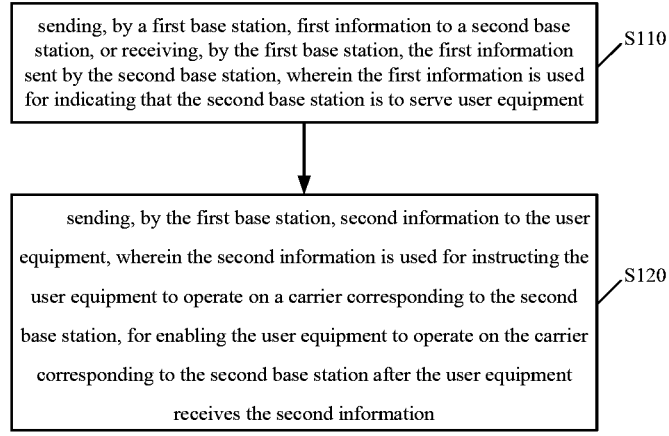
FIG. 1 is a schematic flowchart of a data transmission method according to an embodiment of the present disclosure.

FIG. 1 is a schematic flowchart of a data transmission method 100 according to an embodiment of the present disclosure. As shown in FIG. 1, the method 100 includes:

S110, sending, by a first base station, first information to a second base station, or receiving, by the first base station, the first information sent by the second base station, wherein the first information is used for indicating that the second base station is to serve user equipment; at this time, the user equipment operates on a carrier corresponding to the first base station;

S120, sending, by the first base station, second information to the user equipment, wherein the second information is used for instructing the user equipment to operate on a carrier corresponding to the second base station, for enabling the user equipment to operate on the carrier corresponding to the second base station after the user equipment receives the second information.

In an embodiment of the present disclosure, the first base station and the second base station interact with the user equipment by means of different carriers, and the first base station and the second base station have different divisions of labor for the user equipment. For example, the first base station is responsible for control signaling of the user equipment, and the second base station is responsible for data signaling of the user equipment; of course, the first base station may be responsible for the data signaling of the user equipment, and the second base station is responsible for the control signaling of the user equipment. One of the first base station and the second base station may be a macro base station and the other is a micro base station; or, both are macro base stations, as long as cells corresponding to the two base stations have the same coverage range. In an embodiment of the present disclosure, if the first base station is responsible for the control signaling of the user equipment and the second base station is responsible for the data signaling of the user equipment, when the user equipment operates on the carrier corresponding to the second base station, the user equipment may still be in radio resource control (referred to as "RRC) connection with the first base station. In the embodiments of the present disclosure, the carrier may also be called a serving cell, but the cell herein is slightly different from a traditional physical cell, and different carriers may belong to one physical cell. In the embodiments of the present disclosure, different base stations correspond to different carriers, which may also be called that different base stations correspond to different frequency points.

In an embodiment of the present disclosure, the first base station and the second base station may transmit information through an X2 interface.

In an embodiment of the present disclosure, the user equipment originally operating on the carrier corresponding to the first base station may deactivate the carrier corresponding to the first base station, and then activate the carrier corresponding to the second base station, to operate on the carrier corresponding to the second base station.

In an embodiment of the present disclosure, the method 100 may further include:

sending, by the first base station, third information to the user equipment, wherein the third information is used for instructing the user equipment to operate on the carrier corresponding to the first base station, for enabling the user equipment to operate on the carrier corresponding to the first base station on a particular sub-frame and continue to operate on the carrier corresponding to the first base station after the third information is detected.

Specifically, after operating on the carrier corresponding to the second base station, the user equipment may operate on the carrier corresponding to the first base station on the particular sub-frame, to determine whether the third information used for instructing the user equipment to operate on the carrier corresponding to the first base station exists. If the third information exists, the user equipment may continue to operate on the carrier corresponding to the first base station. If the third information does not exist, the user equipment may switch to the carrier corresponding to the second base station and may send fifth information to the second base station, in order to request the second base station to serve itself; and then, after receiving the fifth information of the user equipment, the second base station begins to serve the user equipment. At this time, the first base station may be a macro base station, the second base station may be a micro base station, the first base station may be responsible for the control signaling of the user equipment, and the second base station may be responsible for the data signaling of the user equipment. Or, the first base station may be a macro base station, the second base station may also be a macro base station, the first base station may be responsible for the control signaling of the user equipment, and the second base station may be responsible for the data signaling of the user equipment. The third information herein may refer to RRC control signaling, for example, a paging message, a system message or the like. When the third information is the system message, according to a time window corresponding to the system message, the user equipment may know whether to continue to operate on the carrier corresponding to the first base station.

In an embodiment of the present disclosure, before that the user equipment operates on the carrier corresponding to the first base station on the particular sub-frame, the method 100 may further include:

sending information used for indicating the particular sub-frame to the user equipment, for enabling the user equipment to operate on the carrier corresponding to the first base station on the particular sub-frame according to the information used for indicating the particular sub-frame.

Specifically, when the user equipment operates on the carrier corresponding to the first base station, the first base station may send the information used for indicating the particular sub-frame to the user equipment, for enabling the user equipment to operate on the carrier corresponding to the first base station according to the particular sub-frame indicated by the information used for indicating the particular sub-frame after operating on the carrier corresponding to the second base station, in order to detect whether the third information exists. Of course, when the user equipment operates on the carrier corresponding to the second base station, the first base station may also send the information used for indicating the particular sub-frame to the user equipment through the second base station, so that the user equipment may operate on the carrier corresponding to the first base station on the particular sub-frame indicated by the information used for indicating the particular sub-frame, in order to detect whether the third information exists. At this time, the first base station may be a macro base station, the second base station may be a micro base station, the first base station may be responsible for the control signaling of the user equipment, and the second base station may be responsible for the data signaling of the user equipment; or the first base station may be a macro base station, the second base station may also be a macro base station, the first base station may be responsible for the control signaling of the user equipment, and the second base station may be responsible for the data signaling of the user equipment.

In an embodiment of the present disclosure, before that the user equipment operates on the carrier corresponding to the first base station on the particular sub-frame, the method 100 may further include:

sending the information used for indicating the particular sub-frame to the second base station, for enabling the second base station not to send data to the user equipment on the particular sub-frame according to the information used for indicating the particular sub-frame.

Specifically, the first base station may also send the information used for indicating the particular sub-frame to the second base station, wherein the first base station may only send the information used for indicating the particular sub-frame to the second base station, and the second base station does not send data to the user equipment on the particular sub-frame according to the information used for indicating the particular sub-frame, so that the user equipment may determine, according to the condition that the second base station sends no data to itself, that it needs to operate on the carrier corresponding to the first base station to detect whether the third information exists. Of course, the first base station may both send the information used for indicating the particular sub-frame to the second base station and send the information used for indicating the particular sub-frame to the user equipment, so that, on the particular sub-frame, the user equipment operates on the carrier corresponding to the first base station and the second base station does not send data to the user equipment. At this time, the first base station may be a macro base station, the second base station may be a micro base station, the first base station may be responsible for the control signaling of the user equipment, and the second base station may be responsible for the data signaling of the user equipment; or the first base station may be a macro base station, the second base station may also be a macro base station, the first base station may be responsible for the control signaling of the user equipment, and the second base station may be responsible for the data signaling of the user equipment.

In an embodiment of the present disclosure, after detecting no third information on the carrier corresponding to the first base station, the user equipment may operate on the carrier corresponding to the second base station and send fifth information to the second base station, wherein the fifth information is used for requesting the second base station to serve the user equipment. Accordingly, after receiving the fifth information sent by the user equipment, the second base station begins to serve the user equipment.

In an embodiment of the present disclosure, the information used for indicating the particular sub-frame may be a bitmap, for example, [100100100100], wherein the sub-frame indicated by 1 is the particular sub-frame, and the sub-frame indicated by 0 is a non-particular sub-frame. The cited bitmap is a periodic bitmap, namely that each two particular sub-frames are separated for the same number of non-particular sub-frames. Of course, the two particular sub-frames may be separated for different numbers of non-particular sub-frames, or the information used for indicating the particular sub-frame may also be other types of information besides the bitmap and should be determined according to specific conditions, and this is not limited in the embodiment of the present disclosure.

In an embodiment of the present disclosure, when the first information is sent by the second base station to the first base station, the receiving, by a first base station, first information sent by a second base station, may include:

receiving, by the first base station, the first information sent by the second base station after the second base station determines that a downlink semi-persistent scheduling service needs to be sent to the user equipment.

Specifically, when determining that a downlink semi-persistent scheduling service needs to be sent to the user equipment, the second base station may send the first information to the first base station serving the user equipment at the moment; and then, the first base station sends the second information to the user equipment; after receiving the second information sent by the first base station, the user equipment operates on the carrier corresponding to the second base station, in order to receive the downlink semi-persistent scheduling service sent by the second base station. At this time, the second base station may be a macro base station, and the first base station may be a micro base station; or, the second base station may be a macro base station, and the first base station may also be a macro base station, the second base station may be responsible for the control signaling of the user equipment, and the first base station may be responsible for the data signaling of the user equipment.

After the user equipment operates on the carrier corresponding to the second base station, the second base station will perform data scheduling on the user equipment and may perform the data scheduling in the following manner aiming at the semi-persistent scheduling service specifically: after the kth sub-frame after the first information is sent through an X2 interface, the second base station may send physical downlink control channel signaling to the user equipment, wherein the physical downlink control channel signaling is used for triggering the semi-persistent scheduling service of the user equipment, k is greater than or equal to 8+t, and t is an integer greater than or equal to 5.

In an embodiment of the present disclosure, when the first information is sent by the first base station to the second base station, before the sending, by the first base station, the first information to the second base station, the method 100 may further include:

receiving, by the first base station, fourth information sent by the user equipment after the user equipment determines that an uplink semi-persistent scheduling service needs to be sent to the second base station, wherein the fourth information is used for requesting for operating on the carrier corresponding to the second base station; for example, the fourth information is information of a cache state of the user equipment.

Specifically, when determining that the uplink semi-persistent scheduling service needs to be sent to the second base station, the user equipment may send a request of operating on the carrier corresponding to the second base station to the first base station, and accordingly, the first base station may send the first information to the second base station according to the request sent by the user equipment, for enabling the second base station to begin to serve the user equipment; the first base station also sends second information serving as the response of the request to the user equipment, and accordingly, the user equipment may operate on the carrier corresponding to the second base station according to the second information. At this time, the second base station may be a macro base station, and the first base station may be a micro base station; or the second base station may be a macro base station, and the first base station may also be a macro base station, the second base station may be responsible for the control signaling of the user equipment, and the first base station may be responsible for the data signaling of the user equipment.

Therefore, in the embodiments of the present disclosure, the first base station sends the first information to the second base station, or the first base station receives the first information sent by the second base station, wherein the first information is used for indicating that the second base station is to serve the user equipment; the first base station sends the second information to the user equipment, wherein the second information is used for instructing the user equipment to operate on the carrier corresponding to the second base station, for enabling the user equipment to operate on the carrier corresponding to the second base station after the user equipment receives the second information. Accordingly, the user equipment which can not operate simultaneously on cells corresponding to two base stations may operate in a time-sharing manner in a system of multi-carrier polymerization between the base stations, and the time of the user equipment operating in the corresponding cells of the two base stations may be dynamically determined according to actual demand, thus avoiding the problem of reduced user service quality induced when the user equipment operates in a static time-sharing manner; for high-capacity user equipment, due to the interaction between the base stations, the wrong scheduling probability is reduced, and the performance loss caused by wrong scheduling is avoided.

The embodiments are particularly suitable for scenarios in which such services as semi-persistent scheduling service and the like are served by the macro base station for the user equipment. When the macro base station serves the user equipment by adopting such services as uplink semi-persistent scheduling service and the like, the user equipment may be quickly switched to operate under the macro base station, thus reducing the service delay of the semi-persistent scheduling services.

The data transmission method according to the embodiments of the present disclosure has been described above from the first base station side in combination with FIG. 1, and the data transmission method according to the embodiments of the present disclosure will be described below from the second base station side in combination with FIG. 2.

Figure 2:
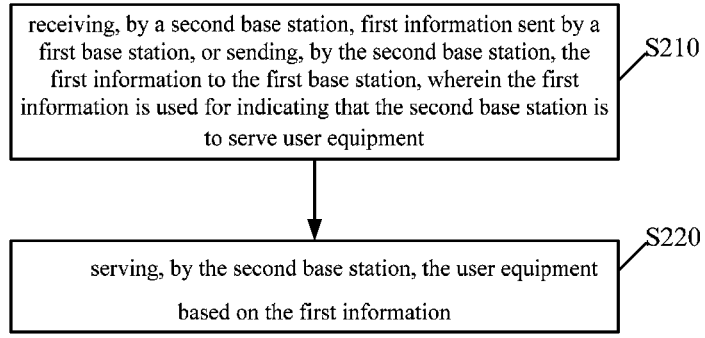
FIG. 2 is a schematic flowchart of a data transmission method according to an embodiment of the present disclosure.

FIG. 2 is a schematic flowchart of a data transmission method 200 according to an embodiment of the present disclosure. As shown in FIG. 2, the method 200 may include:

S210, receiving, by a second base station, first information sent by a first base station, or sending, by the second base station, the first information to the first base station, wherein the first information is used for indicating that the second base station is to serve user equipment; at this time, the user equipment operates on a carrier corresponding to the first base station; and S220, serving, by the second base station, the user equipment based on the first information.

In an embodiment of the present disclosure, the first base station and the second base station interact with the user equipment by means of different carriers, and the first base station and the second base station have different divisions of labor for the user equipment.

In an embodiment of the present disclosure, the method 200 may further include:

receiving, by the second base station, information used for indicating a particular sub-frame and sent by the first base station; not sending, by the second base station, data to the user equipment on the particular sub-frame indicated by the information used for indicating the particular sub-frame, according to the information used for indicating the particular sub-frame. At this time, the first base station may be a macro base station, the second base station may be a micro base station, the first base station may be responsible for the control signaling of the user equipment, and the second base station may be responsible for the data signaling of the user equipment; or, the first base station may be a macro base station, the second base station may also be a macro base station, the first base station may be responsible for the control signaling of the user equipment, and the second base station may be responsible for the data signaling of the user equipment.

In an embodiment of the present disclosure, the method 200 may further include:

receiving, by the second base station, fifth information sent by the user equipment when the user equipment operates on the carrier corresponding to the second base station on a non-particular sub-frame after the user equipment detects no third information when operating on the carrier corresponding to the first base station on the particular sub-frame, wherein the third information is used for instructing the user equipment to operate on the carrier corresponding to the first base station, and the fifth information is used for requesting the second base station to serve the user equipment; and serving, by the second base station, the user equipment based on the fifth information. At this time, the first base station may be a macro base station, the second base station may be a micro base station, the first base station may be responsible for the control signaling of the user equipment, and the second base station may be responsible for the data signaling of the user equipment; or, the first base station may be a macro base station, the second base station may also be a macro base station, the first base station may be responsible for the control signaling of the user equipment, and the second base station may be responsible for the data signaling of the user equipment.

In an embodiment of the present disclosure, when the first information is sent by the second base station to the first base station, before the sending, by the second base station, the first information to the first base station, the method 200 may further include:

determining, by the second base station, that a downlink semi-persistent scheduling service needs to be sent to the user equipment.

Specifically, when determining that a downlink semi-persistent scheduling service needs to be sent to the user equipment, the second base station may send the first information to the first base station serving the user equipment at the moment; and then, the first base station sends the second information to the user equipment; after receiving the second information sent by the first base station, the user equipment operates on the carrier corresponding to the second base station, in order to receive the downlink semi-persistent scheduling service sent by the second base station. At this time, the second base station may be a macro base station, and the first base station may be a micro base station; or the second base station may be a macro base station, and the first base station may also be a macro base station, the second base station may be responsible for the control signaling of the user equipment, and the first base station may be responsible for the data signaling of the user equipment.

After the user equipment operates on the carrier corresponding to the second base station, the second base station will perform data scheduling on the user equipment and may perform the data scheduling in the following manner aiming at the semi-persistent scheduling service specifically: after the kth sub-frame after the first information is sent through an X2 interface, the second base station may send physical downlink control channel signaling to the user equipment, wherein the physical downlink control channel signaling is used for triggering the semi-persistent scheduling service of the user equipment, k is greater than or equal to 8+t, and t is an integer greater than or equal to 5.

In an embodiment of the present disclosure, the serving, by the second base station, the user equipment, includes:

sending physical downlink control channel signaling used for triggering a semi-persistent service of the user equipment to the user equipment, after send a k sub-frame of the first information is sent.

In an embodiment of the present disclosure, when the first information is sent by the first base station to the second base station, in S110, the receiving, by a second base station, first information sent by a first base station, may include:

receiving, by the second base station, the first information sent by the first base station after the first base station receives the fourth information sent by the user equipment, wherein the fourth information is sent by the user equipment to the first base station when the user equipment determines that an uplink semi-persistent scheduling service needs to be sent to the second base station, and the fourth information is used for requesting for operating on the carrier corresponding to the second base station. At this time, the second base station may be a macro base station, and the first base station may be a micro base station; or, the second base station may be a macro base station, and the first base station may also be a macro base station, the second base station may be responsible for the control signaling of the user equipment, and the first base station may be responsible for the data signaling of the user equipment.

Specific description of method 200 may refer to method 100. For concision, it will not be repeated redundantly herein.

Therefore, in the embodiments of the present disclosure, the second base station receives the first information sent by the first base station, or the second base station sends the first information to the first base station, wherein the first information is used for indicating that the second base station is to serve the user equipment; and the second base station serves the user equipment based on the first information. Accordingly, the user equipment which can not operate simultaneously in cells corresponding to two base stations may operate in a time-sharing manner in a system of multi-carrier polymerization between the base stations, and the time of the user equipment operating in the corresponding cells of the two base stations may be dynamically determined according to actual demand, in order to avoid the problem of reduced user service quality induced when the user equipment operates in a static time-sharing manner; for high-capacity user equipment, due to the interaction between the base stations, the wrong scheduling probability is reduced, and the performance loss caused by wrong scheduling is avoided.

The embodiments are particularly suitable for scenarios in which such services as semi-persistent scheduling service and the like are served by the macro base station for the user equipment. When the macro base station serves the user equipment by adopting such services as uplink semi-persistent scheduling service and the like, the user equipment may be quickly switched to operate under the macro base station, in order to reduce the service delay of the semi-persistent scheduling services.

The data transmission method according to the embodiment of the present disclosure has been described above from the first base station side and the second base station side in combination with FIG. 1 and FIG. 2, and the data transmission method according to the embodiment of the present disclosure will be described below from the user equipment side in combination with FIG. 3.

Figure 3:
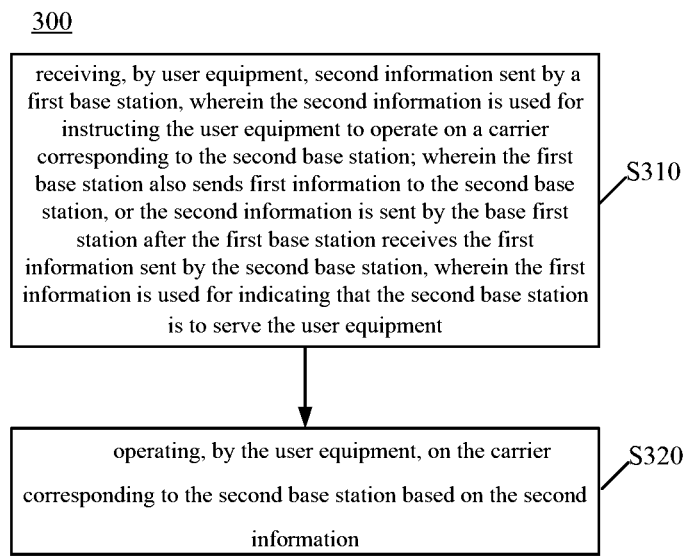
FIG. 3 is a schematic flowchart of a data transmission method according to another embodiment of the present disclosure.

FIG. 3 is a schematic flowchart of a data transmission method 300 according to an embodiment of the present disclosure. As shown in FIG. 3, the method 300 includes:

S310, receiving, by user equipment, second information sent by a first base station, wherein the second information is used for instructing the user equipment to operate on a carrier corresponding to the second base station; wherein the first base station also sends first information to the second base station, or the second information is sent by the base first station after the first base station receives the first information sent by the second base station, wherein the first information is used for indicating that the second base station is to serve the user equipment; at this time, the user equipment operates on the carrier corresponding to the first base station;

S320, operating, by the user equipment, on the carrier corresponding to the second base station based on the second information.

In an embodiment of the present disclosure, the first base station and the second base station interact with the user equipment by means of different carriers, and the first base station and the second base station have different divisions of labor for the user equipment.

In an embodiment of the present disclosure, the method 300 may further include:

operating, by the user equipment, on the carrier corresponding to the first base station on a particular sub-frame; and detecting, by the user equipment, whether third information sent by the first base station exists, wherein the third information is used for instructing the user equipment to operate on the carrier corresponding to the first base station; operating, by the user equipment, on the carrier corresponding to the first base station, when the third information exists. At this time, the first base station may be a macro base station, the second base station may be a micro base station, the first base station may be responsible for the control signaling of the user equipment, and the second base station may be responsible for the data signaling of the user equipment; or, the first base station may be a macro base station, the second base station may also be a macro base station, the first base station may be responsible for the control signaling of the user equipment, and the second base station may be responsible for the data signaling of the user equipment.

In an embodiment of the present disclosure, the method 300 may further include:

operating, by the user equipment, on the carrier corresponding to the second base station on a non-particular sub-frame, if the third information does not exist; sending, by the user equipment, fifth information to the second base station, wherein the fifth information is used for requesting the second base station to serve the user equipment. At this time, the first base station may be a macro base station, the second base station may be a micro base station, the first base station may be responsible for the control signaling of the user equipment, and the second base station may be responsible for the data signaling of the user equipment; or the first base station may be a macro base station, the second base station may also be a macro base station, the first base station may be responsible for the control signaling of the user equipment, and the second base station may be responsible for the data signaling of the user equipment.

In an embodiment of the present disclosure, before the operating, by the user equipment, on the carrier corresponding to the first base station on a particular sub-frame, the method 300 may further include:

receiving information used for indicating the particular sub-frame and sent by the base station. At this time, the first base station may be a macro base station, and the second base station may be a micro base station.

In an embodiment of the present disclosure, the first information is sent by the first base station to the second base station; before the receiving, by user equipment, second information sent by a first base station, the method 300 may further include:

determining, by the user equipment, that an uplink semi-persistent scheduling service needs to be sent to the second base station;

sending, by the user equipment, fourth information to the first base station, wherein the fourth information is used for requesting for operating on a carrier corresponding to the second base station. At this time, the second base station may be a macro base station, and the first base station may be a micro base station; or, the second base station may be a macro base station, and the first base station may also be a macro base station, the second base station may be responsible for the control signaling of the user equipment, and the first base station may be responsible for the data signaling of the user equipment.

Specific description of method 300 may refer to method 100 and method 200. For concision, it will not be repeated redundantly herein.

Therefore, in the embodiments of the present disclosure, the user equipment receives the second information sent by the first base station, wherein the second information is used for instructing the user equipment to operate on the carrier corresponding to the second base station; the first base station also sends the first information to the second base station or the second information is sent by the first base station after the first base station receives the first information sent by the second base station, wherein the first information is used for indicating that the second base station is to serve the user equipment; and the user equipment operates on the carrier corresponding to the second base station based on the second information. Accordingly, the user equipment which can not operate simultaneously in cells corresponding to two base stations may operate in a time-sharing manner in a system of multi-carrier polymerization between the base stations, and the time of the user equipment operating in the corresponding cells of the two base stations may be dynamically determined according to actual demand, in order to avoid the problem of reduced user service quality induced when the user equipment in a static time-sharing manner; for high-capacity user equipment, due to the interaction between the base stations, the wrong scheduling probability is reduced, and the performance loss caused by wrong scheduling is avoided.

The embodiments are particularly suitable for scenarios in which such services as semi-persistent scheduling service and the like are served by the macro base station for the user equipment. When the macro base station serves the user equipment by adopting such services as uplink semi-persistent scheduling service and the like, the user equipment may be quickly switched to operate under the macro base station, in order to reduce the service delay of the semi-persistent scheduling services.

The data transmission method according to the embodiments of the present disclosure has been described above respectively from the first base station side, the second base station side and the user equipment side in combination with FIG. 1 to FIG. 3, and the data transmission method according to the embodiment of the present disclosure will be described below in a mutual interaction manner of three parties.

Figure 4:
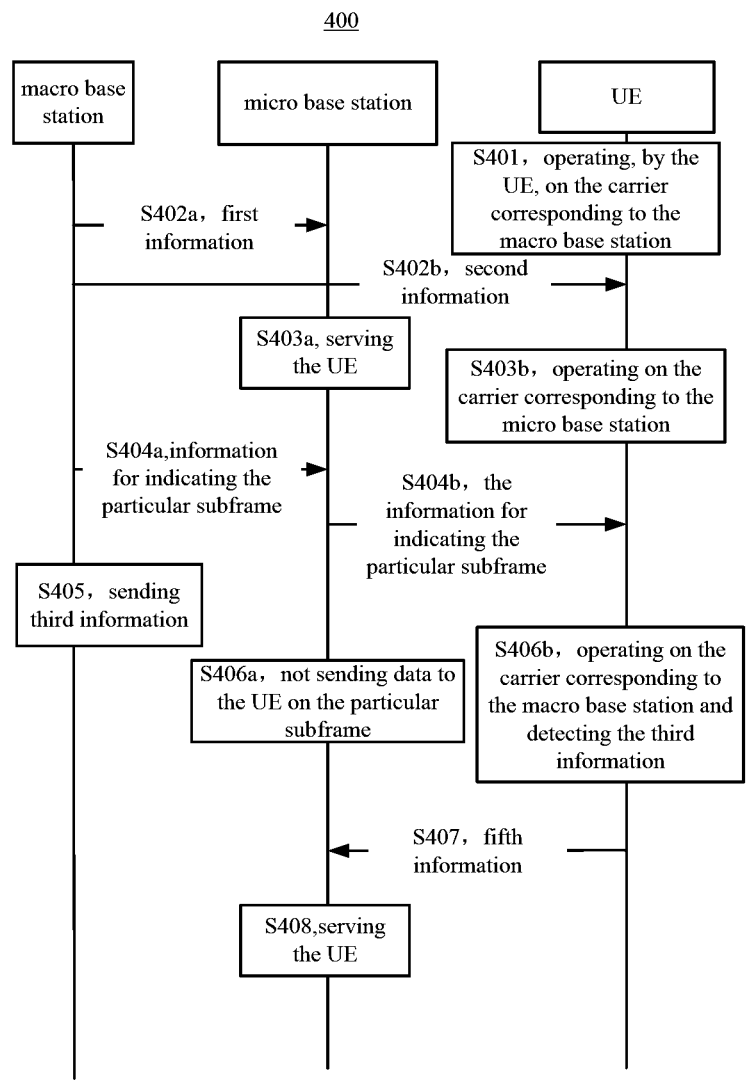
FIG. 4 is a schematic flowchart of a data transmission method according to another embodiment of the present disclosure.

FIG. 4 is a schematic flowchart of a data transmission method 400 according to an embodiment of the present disclosure. In method 400, it is assumed that user equipment primarily operates on a carrier corresponding to a macro base station (first base station). As shown in FIG. 4, the method 400 includes:

S401, operating, by the user equipment, on the carrier corresponding to the macro base station (first base station);

S402a, sending, by the macro base station, first information to a micro base station (second base station) to instruct the micro base station to serve the user equipment, after the macro base station determines that no data needs to be sent to the user equipment or that transmission of data that needs to be transmitted to the user equipment is completed;

S402b, sending, by the macro base station, second information to the user equipment to instruct the user equipment to operate on a carrier corresponding to the micro base station, after the macro base station determines that no data needs to be sent to the user equipment or that transmission of data that needs to be transmitted to the user equipment is completed; S402a and S402b may be implemented at the same time, S402a may be firstly implemented and then S402b is implemented, or S402b is firstly implemented and then S402a is implemented;

S403a, beginning, by the micro base station, to serve the user equipment after the micro base station receives the first information sent by the macro base station;

S403b, operating, by the user equipment, on the carrier corresponding to the micro base station after the user equipment receives the second information sent by the macro base station;

S404a, sending, by the macro base station, information used for indicating a particular sub-frame to the micro base station, wherein the information used for indicating the particular sub-frame is used for indicating that the user equipment needs to operate on the carrier corresponding to the macro base station, in order to detect the particular sub-frame of third information, wherein the third information is used for instructing the user equipment to operate on the carrier corresponding to the macro base station;

S404b, storing, by the micro base station, the information used for indicating the particular sub-frame and transferring the information used for indicating the particular sub-frame to the user equipment, after the micro base station receives the information used for indicating the particular sub-frame sent by the macro base station;

S405, sending, by the macro base station, the third information to instruct the user equipment to operate on the carrier corresponding to the macro base station;

S406a, not sending, by the micro base station, data to the user equipment on the particular sub-frame according to the information used for indicating the particular sub-frame;

S406b, operating, by the user equipment, on the carrier corresponding to the first base station on the particular sub-frame according to the information used for indicating the particular sub-frame, detecting whether the third information exists, continuing to operate on the carrier corresponding to the macro base station if the third information exists, and if the third information does not exist, operating on the carrier corresponding to the micro base station and implementing the subsequent step;

S407, after operating on the carrier corresponding to the micro base station, sending, by the user equipment, fifth information to the micro base station, for requesting the micro base station to serve the micro base station; and S408, beginning, by the micro base station, to serve the user equipment after the micro base station receives the fifth information sent by the user equipment.

Figure 5:
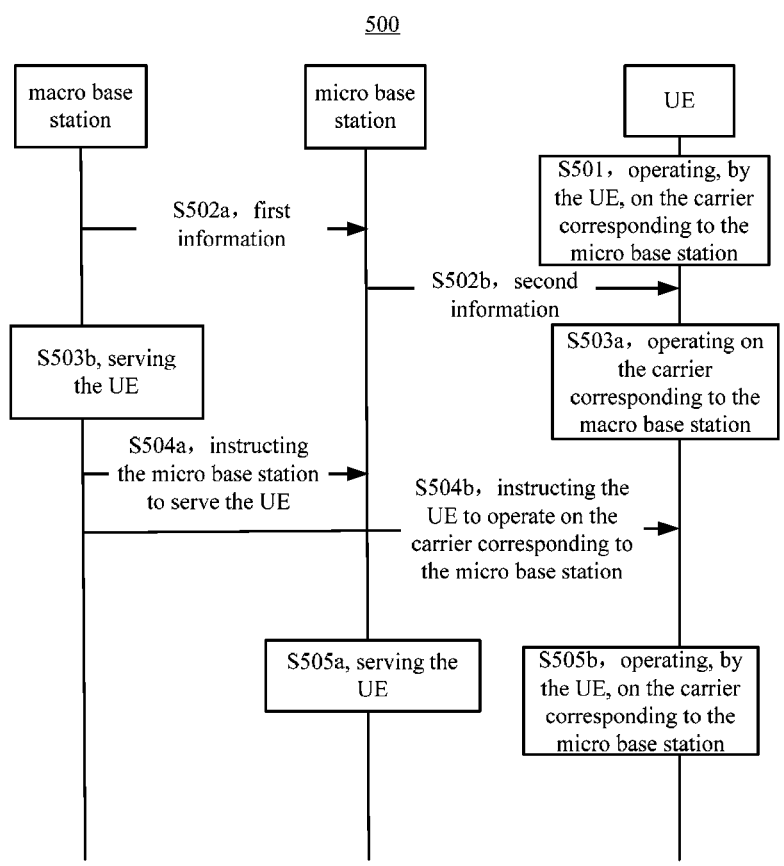
FIG. 5 is a schematic flowchart of a data transmission method according to another embodiment of the present disclosure.

FIG. 5 is a schematic flowchart of a data transmission method 500 according to another embodiment of the present disclosure. In the method 500, it is assumed that user equipment primarily operates on a carrier corresponding to a micro base station (first base station). As shown in FIG. 5, the method 500 includes:

S501, operating, by the user equipment, on the carrier corresponding to the micro base station (first base station);

S502a, determining, by a macro base station (second base station), that a downlink semi-persistent scheduling service needs to be sent to the user equipment; at this time, the user equipment operates on the carrier corresponding to the micro base station, and the macro base station sends first information to the micro base station, to instruct the macro base station to serve the user equipment;

S502b, after the micro base station receives the first information sent by the macro base station, sending, by the micro base station, second information to the user equipment to indicate the user equipment to operate on the carrier corresponding to the first base station;

S503a, operating, by the user equipment, on the carrier corresponding to the macro base station after the user equipment receives the second information sent by the micro base station;

S503b, sending, by the macro base station, physical downlink control channel signaling to the user equipment on the kth sub-frame after the first information is sent to the micro base station, wherein the physical downlink control channel signaling is used for triggering the semi-persistent scheduling service of the UE, and the value of k is greater than or equal to 8+t;

S504a, sending, by the macro base station, information used for instructing the micro base station to serve the user equipment to the micro base station, after the macro base station determines that no data needs to be sent to the user equipment or that transmission of data that needs to be transmitted to the user equipment is completed;

S504b, sending, by the macro base station, information used for instructing the user equipment to operate on the carrier corresponding to the micro base station to the user equipment, after the macro base station determines that no data needs to be sent to the user equipment or that transmission of data that needs to be transmitted to the user equipment;

S505a, beginning, by the micro base station, to serve the user equipment after the micro base station receives the information used for instructing the micro base station to serve the user equipment sent by the macro base station;

S505b, operating, by the user equipment, on the carrier corresponding to the micro base station, after the user equipment receives the information used for instructing the user equipment to operate on the carrier corresponding to the micro base station sent by the macro base station.

Figure 6:
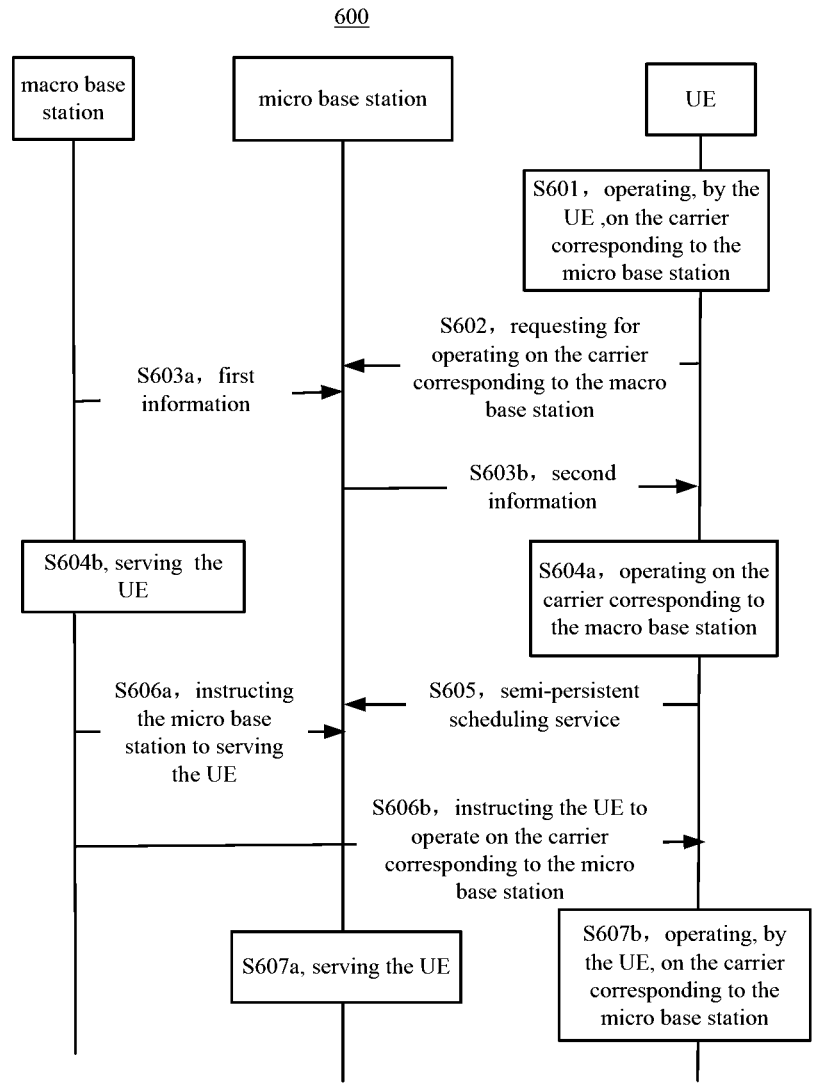
FIG. 6 is a schematic flowchart of a data transmission method according to another embodiment of the present disclosure.

FIG. 6 is a schematic flowchart of a data transmission method 600 according to an embodiment of the present disclosure. User equipment primarily operates on a carrier corresponding to a micro base station (first base station). As shown in FIG. 6, the method 600 includes:

S601, operating, by the user equipment, on the carrier corresponding to the micro base station;

S602, determining, by the user equipment, that an uplink semi-persistent scheduling service needs to be sent to the user equipment, and sending information used for requesting for operating on a carrier corresponding to a macro base station to the macro base station (second base station);

S603a, sending, by the micro base station, first information to the macro base station, after the micro base station receives the information for requesting for operating on the carrier corresponding to the macro base station sent by the user equipment, for instructing the macro base station to serve the user equipment;

S603b, sending, by the micro base station, second information to the user equipment, for instructing the user equipment to operate on the carrier corresponding to the macro base station;

S604a, receiving, by the user equipment, the second information sent by the micro base station, and operating on the carrier corresponding to the macro base station, which may be achieved by deactivating the carrier corresponding to the micro base station and activating the carrier corresponding to the macro base station;

S604b, receiving, by the macro base station, the first information sent by the micro base station, and serving the user equipment;

S605, sending, by the user equipment, a semi-persistent scheduling service to the macro base station;

S606a, sending, by the macro base station, information used for instructing the micro base station to serve the user equipment, when the macro base station determines that the semi-persistent scheduling service sent by the user equipment has been received and no downlink data needs to be sent to the user equipment;

S606b, sending, by the macro base station, information used for instructing the user equipment to operate on the carrier corresponding to the micro base station, after the macro base station determines that no data needs to be sent to the user equipment or that transmission of data that needs to be transmitted to the user equipment is completed;

S607a, beginning, by the micro base station, to serve the user equipment, after the micro base station receives the information used for instructing the micro base station to serve the user equipment; and S607b, operating, by the user equipment, on the carrier corresponding to the micro base station, after the user equipment receives the information used for instructing the user equipment to operate on the carrier corresponding to the micro base station sent by the macro base station.

Therefore, in the embodiments of the present disclosure, the first base station sends the first information to the second base station, or the first base station receives the first information sent by the second base station, wherein the first information is used for indicating that the second base station is to serve the user equipment; the first base station sends the second information to the user equipment, wherein the second information is used for instructing the user equipment to operate on the carrier corresponding to the second base station, for enabling the user equipment to operate on the carrier corresponding to the second base station after the user equipment receives the second information. Accordingly, the user equipment which can not operate simultaneously in cells corresponding to two base stations may operate in a time-sharing manner in a system of multi-carrier polymerization between the base stations, and the time of the user equipment operating in the corresponding cells of the two base stations may be dynamically determined according to actual demand, in order to avoid the problem of reduced user service quality induced when the user equipment operates in a static time-sharing manner; for high-capacity user equipment, due to the interaction between the base stations, the wrong scheduling probability is reduced, and the performance loss caused by wrong scheduling is avoided.

The embodiments are particularly suitable for scenarios in which such services as semi-persistent scheduling service and the like are served by the macro base station for the user equipment. When the macro base station serves the user equipment by adopting such services as uplink semi-persistent scheduling service and the like, the user equipment may be quickly switched to operate under the macro base station, in order to reduce the service delay of the semi-persistent scheduling services.

The data transmission method according to the embodiments of the present disclosure has been described above in combination with FIG. 1 to FIG. 6, and data transmission devices including a base station and user equipment according to the embodiments of the present disclosure will be described below in combination with FIG. 7 to FIG. 18.

Figure 7:
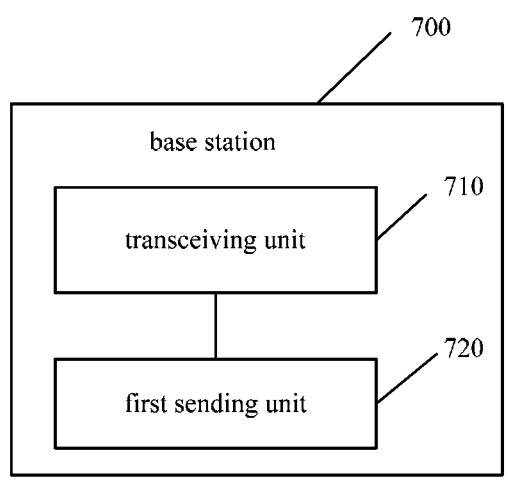
FIG. 7 is a schematic block diagram of a base station according to an embodiment of the present disclosure.

FIG. 7 is a schematic block diagram of a base station 700 according to an embodiment of the present disclosure. The base station 700 is a first base station applied to the data transmission method, and the base station 700 includes:

a transceiving unit 710, configured to send first information to a second base station, or receive the first information sent by the second base station, wherein the first information is used for indicating that the second base station is to serve user equipment;

a first sending unit 720, configured to send second information to the user equipment, wherein the second information is used for instructing the user equipment to operate on a carrier corresponding to the second base station, for enabling the user equipment to operate on the carrier corresponding to the second base station after the user equipment receives the second information.

Optionally, the base station 700 and the second base station interact with the user equipment by means of different carriers, and the base station 700 and the second base station have different divisions of labor for the user equipment.

Figure 8:
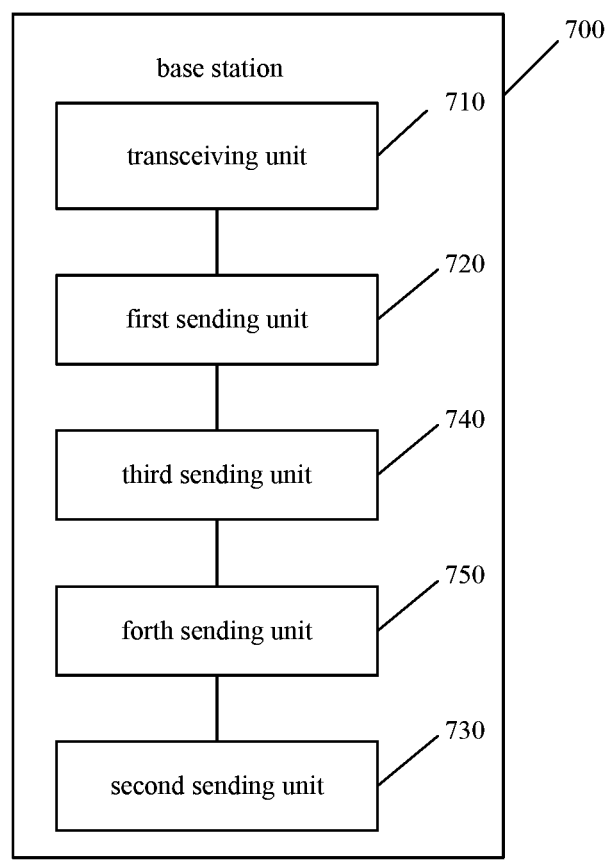
FIG. 8 is a schematic block diagram of a base station according to another embodiment of the present disclosure.

Optionally, as shown in FIG. 8, the base station 700 further includes:

a second sending unit 730, configured to send third information to the user equipment, wherein the third information is used for instructing the user equipment to operate on a carrier corresponding to the base station 700, for enabling the user equipment to operate on the carrier corresponding to the base station 700 on a particular sub-frame and continue to operate on the carrier corresponding to the base station 700 after the third information is detected. At this time, the base station 700 may be a macro base station, and the second base station may be a micro base station.

Optionally, as shown in FIG. 8, the base station 700 further includes:

a third sending unit 740, configured to send information used for indicating the particular sub-frame to the user equipment, for enabling the user equipment to operate on the carrier corresponding to the base station 700 on the particular sub-frame according to the information used for indicating the particular sub-frame. At this time, the base station 700 may be a macro base station, and the second base station may be a micro base station.

Optionally, as shown in FIG. 8, the base station 700 further includes:

a fourth sending unit 750, configured to send the information used for indicating the particular sub-frame to the second base station, for enabling the second base station not to send data to the user equipment on the particular subframe according to the information used for indicating the particular sub-frame. At this time, the base station 700 may be a macro base station, and the second base station may be a micro base station.

Optionally, when the first information is sent by the second base station to the base station 700, the transceiving unit 710 is specifically configured to:

receive the first information sent by the second base station after the second base station determines that a downlink semi-persistent scheduling service needs to be sent to the user equipment. At this time, the base station 700 may be a micro base station, and the second base station may be a macro base station.

Figure 9:
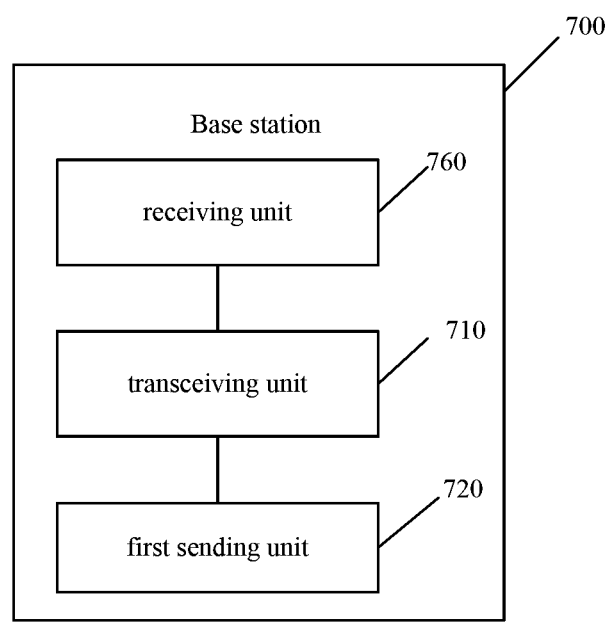
FIG. 9 is a schematic block diagram of a base station according to another embodiment of the present disclosure.

Optionally, as shown in FIG. 9, when the first information is sent by the base station 700 to the second base station, the base station 700 further includes:

a receiving unit 760, configured to receive by the base station fourth information sent by the user equipment after the use equipment determines that an uplink semi-persistent scheduling service needs to be sent to the second base station, wherein the fourth information is used for requesting for operating on the carrier corresponding to the second base station;

wherein the transceiving unit 710 is specifically configured to send the first information to the second base station according to the fourth information received by the receiving unit. At this time, the base station 700 may be a micro base station, and the second base station may be a macro base station.

Therefore, in the embodiments of the present disclosure, the base station 700 sends the first information to the second base station or receives the first information sent by the second base station, wherein the first information is used for indicating that the second base station is to serve the user equipment; the first base station sends the second information to the user equipment, wherein the second information is used for instructing the user equipment to operate on the carrier corresponding to the second base station, for enabling the user equipment to operate on the carrier corresponding to the second base station after the user equipment receives the second information. Accordingly, the user equipment which can not operate simultaneously in cells corresponding to two base stations may operate in a time-sharing manner in a system of multi-carrier polymerization between the base stations, and the time of the user equipment operating in the corresponding cells of the two base stations may be dynamically determined according to actual demand, in order to avoid the problem of reduced user service quality induced when the user equipment operates in a static time-sharing manner; for high-capacity user equipment, due to the interaction between the base stations, the wrong scheduling probability is reduced, and the performance loss caused by wrong scheduling is avoided.

The embodiments are particularly suitable for scenarios in which such services as semi-persistent scheduling service and the like are served by the macro base station for the user equipment. When the macro base station serves the user equipment by adopting such services as uplink semi-persistent scheduling service and the like, the user equipment may be quickly switched to operate under the macro base station, in order to reduce the service delay of the semi-persistent scheduling services.

Figure 10:
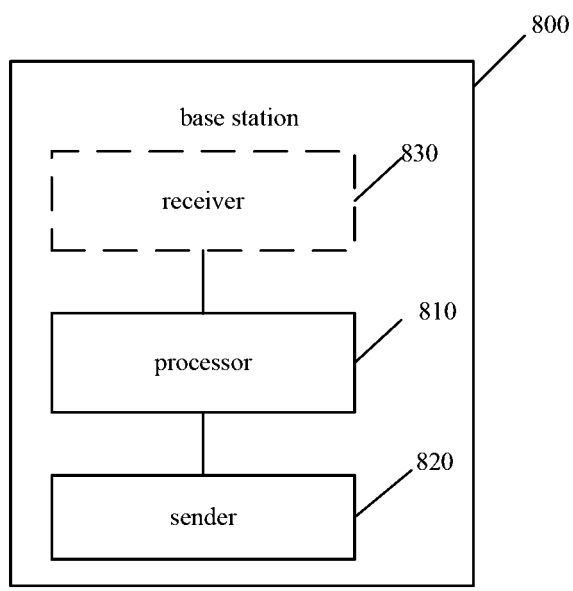
FIG. 10 is a schematic block diagram of a base station according to another embodiment of the present disclosure.

FIG. 10 is a schematic block diagram of a base station 800 according to an embodiment of the present disclosure. The base station 800 is a first base station applied to the data transmission methods, and the base station 800 includes:

a processor 810, configured to generate first information and generate second information, wherein the first information is used for indicating that the second base station is to serve user equipment and the second information is used for instructing the user equipment to operate on a carrier corresponding to the second base station; and a sender 820, configured to send the first information to the second base station, for enabling the second base station to serve the user equipment after the second base station receives the first information, and send the second information to the user equipment, for enabling the user equipment to operate on the carrier corresponding to the second base station after the user equipment receives the second information;

or, the base station 800 includes:

a receiver 830, configured to receive first information sent by a second base station, wherein the first information is used for indicating that the second base station is to serve user equipment; a processor 810, configured to generate second information, wherein the second information is used for instructing the user equipment to operate on a carrier corresponding to the second base station; and a sender 820, configured to send the second information to the user equipment, for enabling the user equipment to operate on the carrier corresponding to the second base station after the user equipment receives the second information.

Optionally, the base station 800 and the second base station interact with the user equipment by means of different carriers, and the base station 700 and the second base station have different divisions of labor for the user equipment.

Optionally, the processor 810 is further configured to generate third information, wherein the third information is used for instructing the user equipment to operate on a carrier corresponding to the base station 700; the sender 820 is further configured to send the third information to the user equipment, for enabling the user equipment to operate on the carrier corresponding to the base station 700 on a particular sub-frame and continue to operate on the carrier corresponding to the base station 700 after the third information is detected. At this time, the base station 700 may be a macro base station, and the second base station may be a micro base station.

Optionally, the processor 810 is further configured to generate information used for indicating a particular sub-frame; and the sender 820 is further configured to send the information used for indicating the particular sub-frame to the user equipment, for enabling the user equipment to operate on the carrier corresponding to the base station 700 on the particular sub-frame according to the information used for indicating the particular sub-frame. At this time, the base station 700 may be a macro base station, and the second base station may be a micro base station.

Optionally, the processor 810 is further configured to generate information used for indicating a particular sub-frame; and the sender 820 is further configured to send the information used for indicating the particular sub-frame to the second base station, for enabling the second base station not to send data to the user equipment on the particular sub-frame according to the information used for indicating the particular sub-frame. At this time, the base station 700 may be a macro base station, and the second base station may be a micro base station.

Optionally, the receiver 830 is specifically configured to:

receive the first information sent by the second base station after the second base station determines that a downlink semi-persistent scheduling service needs to be sent to the user equipment.

Optionally, when the first information is sent by the base station 700 to the second base station, as shown in FIG. 10, the base station 800 further includes a receiver 830, configured to:

receive fourth information sent by the user equipment after the user equipment determines that an uplink semi-persistent scheduling service needs to be sent to the second base station, wherein the fourth information is used for requesting for operating on the carrier corresponding to the second base station;

and the processor 810 is specifically configured to generate the first information according to the fourth information. At this time, the base station 700 may be a micro base station, and the second base station may be a macro base station.

Therefore, in the embodiments of the present disclosure, the base station 700 sends the first information to the second base station or receives the first information sent by the second base station, wherein the first information is used for indicating that the second base station is to serve the user equipment; the first base station sends the second information to the user equipment, wherein the second information is used for instructing the user equipment to operate on the carrier corresponding to the second base station, for enabling the user equipment to operate on the carrier corresponding to the second base station after the user equipment receives the second information. Accordingly, the user equipment which can not operate simultaneously in cells corresponding to two base stations may operate in a time-sharing manner in a system of multi-carrier polymerization between the base stations, and the time of the user equipment operating in the corresponding cells of the two base stations may be dynamically determined according to actual demand, in order to avoid the problem of reduced user service quality induced when the user equipment operates in a static time-sharing manner; for high-capacity user equipment, due to the interaction between the base stations, the wrong scheduling probability is reduced, and the performance loss caused by wrong scheduling is avoided.

The embodiments are particularly suitable for scenarios in which such services as semi-persistent scheduling service and the like are served by the macro base station for the user equipment. When the macro base station serves the user equipment by adopting such services as uplink semi-persistent scheduling service and the like, the user equipment may be quickly switched to operate under the macro base station, in order to reduce the service delay of the semi-persistent scheduling services.

Figure 11:
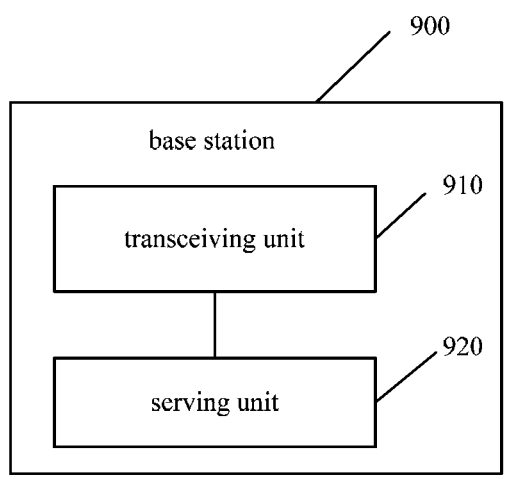
FIG. 11 is a schematic block diagram of a base station according to another embodiment of the present disclosure.

FIG. 11 is a schematic block diagram of a base station 900 according to an embodiment of the present disclosure. The base station 900 is a second base station applied to the data transmission method, and the base station 900 includes:

a transceiving unit 910, configured to receive first information sent by a first base station, or send the first information to the first base station, wherein the first information is used for indicating that the base station 700 is to serve user equipment;

a serving unit 920, configured to serve the user equipment based on the first information.

Optionally, the first base station and the base station 700 interact with the user equipment by means of different carriers, and the first base station and the base station 700 have different divisions of labor for the user equipment.

Figure 12:
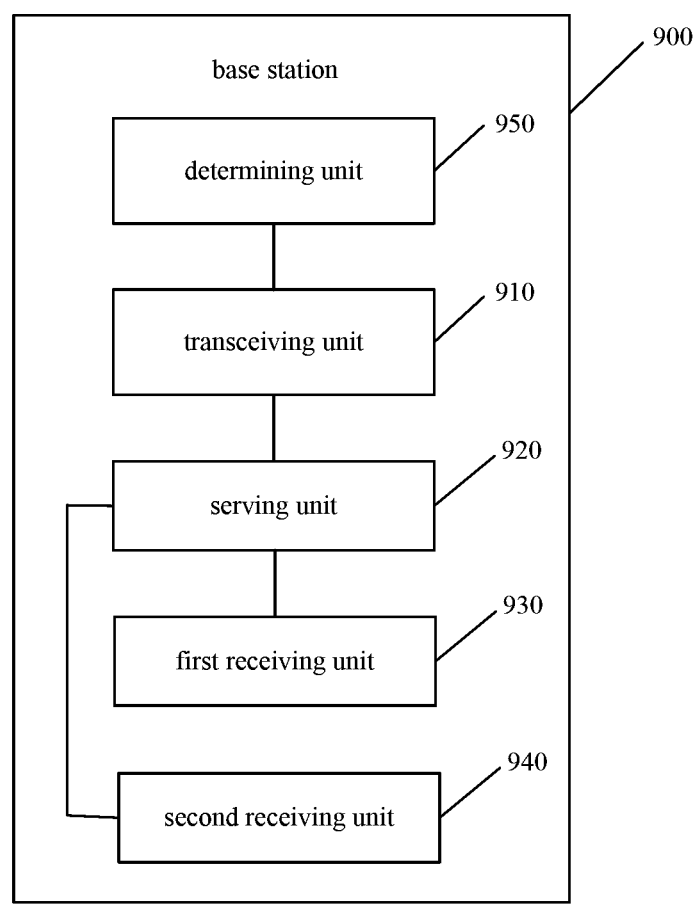
FIG. 12 is a schematic block diagram of a base station according to another embodiment of the present disclosure.

Optionally, as shown in FIG. 12, the base station 900 further includes:

a first receiving unit 930, configured to receive information used for indicating a particular sub-frame and sent by the first base station;

wherein the serving unit 920 is specifically configured to send no data to the user equipment on the particular sub-frame indicated by the information used for indicating the particular sub-frame, according to the information used for indicating the particular sub-frame.

Optionally, as shown in FIG. 12, the base station 900 further includes:

a second receiving unit 940, configured to receive fifth information sent by the user equipment when the user equipment operates on the carrier corresponding to the base station 700 on a non-particular sub-frame after the user equipment detects no third information when operating on the carrier corresponding to the first base station on the particular sub-frame, wherein the third information is used for instructing the user equipment to operate on the carrier corresponding to the first base station, and the fifth information is used for requesting the base station 700 to serve the user equipment;

wherein the serving unit 920 is specifically configured to serve by the base station the user equipment based on the fifth information. At this time, the base station 900 may be a micro base station, and the first base station may be a macro base station.

Optionally, when the first information is sent by the base station 700 to the first base station, as shown in FIG. 12, the base station 900 further includes:

a determining unit 950, configured to determine that a downlink semi-persistent scheduling service needs to be sent to the user equipment;

wherein the transceiving unit 910 is specifically configured to send the first information to the first base station after the determining unit determines that the downlink semi-persistent scheduling service needs to be sent to the user equipment. At this time, the base station 900 may be a micro base station, and the first base station may be a macro base station.

Optionally, the serving unit 920 is specifically configured to:

send, after the kth sub-frame after the first information is sent, physical downlink control channel signaling used for triggering a semi-persistent service of the user equipment to the user equipment, wherein k is not smaller than 8+t, and t is an integer greater than or equal to 5. At this time, the base station 900 may be a micro base station, and the first base station may be a macro base station.

Optionally, when the first information is sent by the first base station to the base station 700, the transceiving unit 910 is specifically configured to:

receive the first information sent by the first base station after the first base station receives the fourth information sent by the user equipment, wherein the fourth information is sent by the user equipment to the first base station when the user equipment determines that an uplink semi-persistent scheduling service needs to be sent to the base station 700, and the fourth information is used for requesting for operating on the carrier corresponding to the base station 700. At this time, the base station 900 may be a macro base station, and the first base station may be a micro base station.

Therefore, in the embodiments of the present disclosure, the base station 700 receives the first information sent by the first base station or sends the first information to the first base station, wherein the first information is used for indicating that the base station 700 is to serve the user equipment; and the base station 700 serves the user equipment based on the first information. Accordingly, the user equipment which can not simultaneously operate in cells corresponding to two base stations may operate in a time-sharing manner in a system of multi-carrier polymerization between the base stations, and the time of the user equipment operating in the corresponding cells of the two base stations may be dynamically determined according to actual demand, in order to avoid the problem of reduced user service quality induced when the user equipment operates in a static time-sharing manner; for high-capacity user equipment, due to the interaction between the base stations, the wrong scheduling probability is reduced, and the performance loss caused by wrong scheduling is avoided.

The embodiments are particularly suitable for scenarios in which such services as semi-persistent scheduling service and the like are served by the macro base station for the user equipment. When the macro base station serves the user equipment by adopting such services as uplink semi-persistent scheduling service and the like, the user equipment may be quickly switched to operate under the macro base station, in order to reduce the service delay of the semi-persistent scheduling services.

Figure 13:
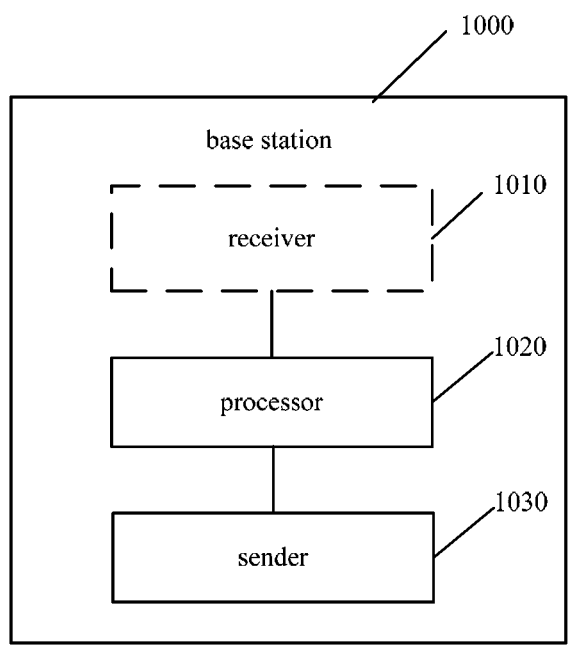
FIG. 13 is a schematic block diagram of a base station according to another embodiment of the present disclosure.

FIG. 13 is a schematic block diagram of a base station 1000 according to an embodiment of the present disclosure. The base station 1000 is a second base station applied to the data transmission method, and the base station 1000 includes:

a receiver 1010, configured to receive first information sent by a first base station, wherein the first information is used for indicating that the base station 700 is to serve user equipment; and a processor 1020, configured to serve the user equipment based on the first information.

Or the base station 1000 includes: a processor 1020, configured to generate first information, wherein the first information is used for indicating that the base station 700 is to serve user equipment;

a sender 1030, configured to send the first information to the first base station; and a processor 1020, configured to serve the user equipment based on the first information.

Optionally, the first base station and the base station 700 interact with the user equipment by means of different carriers, and the first base station and the base station 700 have different divisions of labor for the user equipment.

Optionally, the base station 1000 includes a receiver 1010, and the receiver 1010 is configured to:

receive information used for indicating a particular sub-frame and sent by the first base station;

wherein the processor 1020 is specifically configured to send no data to the user equipment on the particular sub-frame indicated by the information used for indicating the particular sub-frame, according to the information used for indicating the particular sub-frame.

Optionally, the base station 1000 includes a receiver 1010, and the receiver 1010 is configured to:

receive fifth information sent by the user equipment when the user equipment operates on the carrier corresponding to the base station 700 on a non-particular sub-frame after the user equipment detect no third information when operating on the carrier corresponding to the first base station on the particular sub-frame, wherein the third information is used for instructing the user equipment to operate on the carrier corresponding to the first base station, and the fifth information is used for requesting the base station 700 to serve the user equipment;

wherein the processor 1020 is specifically configured to serve the user equipment based on the fifth information. At this time, the base station 1000 may be a micro base station, and the first base station may be a macro base station.

Optionally, when the base station 1000 includes the sender 1030 configured to send the first information to the first base station, the processor 1020 is further configured to determine that a downlink semi-persistent scheduling service needs to be sent to the user equipment;

and the receiver 1030 is specifically configured to send the first information to the first base station after the processor 1020 determines that the downlink semi-persistent scheduling service needs to be sent to the user equipment. At this time, the base station 1000 may be a micro base station, and the first base station may be a macro base station.

Optionally, the processor 1020 is specifically configured to:

instruct, after k sub-frames after the first information is sent, the sender 1030 to send physical downlink control channel signaling used for triggering a semi-persistent service of the user equipment to the user equipment, wherein k is not smaller than 8+t, and t is an integer greater than or equal to 5; the sender 1030 is configured to send the physical downlink control channel signaling used for triggering the semi-persistent service of the user equipment to the user equipment. At this time, the base station 1000 may be a micro base station, and the first base station may be a macro base station.

Optionally, when the first information is sent by the first base station to the base station 700, the receiver 1010 is specifically configured to:

receive the first information sent by the first base station after the first base station receives the fourth information sent by the user equipment, wherein the fourth information is sent by the user equipment to the first base station when the user equipment determines that an uplink semi-persistent scheduling service needs to be sent to the base station 700, and the fourth information is used for requesting for operating on the carrier corresponding to the base station 700. At this time, the base station 1000 may be a macro base station, and the first base station may be a micro base station.

Therefore, in the embodiments of the present disclosure, the base station 700 receives the first information sent by the first base station or sends the first information to the first base station, wherein the first information is used for indicating that the base station 700 is to serve the user equipment; and the base station 700 serves the user equipment based on the first information. Accordingly, the user equipment which can no simultaneously operate in cells corresponding to two base stations may operate in a time-sharing manner in a system of multi-carrier polymerization between the base stations, and the time of the user equipment operating in the corresponding cells of the two base stations may be dynamically determined according to actual demand, in order to avoid the problem of reduced user service quality induced when the user equipment operates in a static time-sharing manner; for high-capacity user equipment, due to the interaction between the base stations, the wrong scheduling probability is reduced, and the performance loss caused by wrong scheduling is avoided.

The embodiments are particularly suitable for scenarios in which such services as semi-persistent scheduling service and the like are served by the macro base station for the user equipment. When the macro base station serves the user equipment by adopting such services as uplink semi-persistent scheduling service and the like, the user equipment may be quickly switched to operate under the macro base station, in order to reduce the service delay of the semi-persistent scheduling services.

Figure 14:
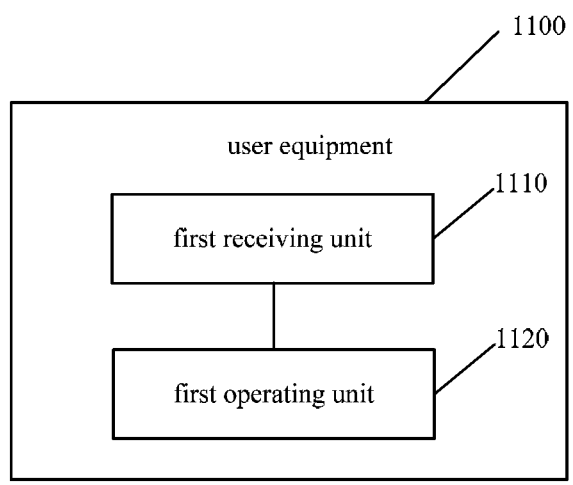
FIG. 14 is a schematic block diagram of user equipment according to an embodiment of the present disclosure.

FIG. 14 is a schematic block diagram of user equipment 1100 according to an embodiment of the present disclosure. As shown in FIG. 14, the user equipment 1100 includes:

a first receiving unit 1100, configured to receive second information sent by a first base station, wherein the second information is used for instructing the user equipment to operate on a carrier corresponding to the second base station; and the first base station also sends first information to the second base station, or the second information is sent by the first base station after the first base station receives the first information sent by the second base station, wherein the first information is used for indicating that the second base station is to serve the user equipment; and a first operating unit 1120, configured to operate on the carrier corresponding to the second base station based on the second information.

Optionally, the first base station and the second base station interact with the user equipment by means of different carriers, and the first base station and the second base station have different divisions of labor for the user equipment.

Figure 15:
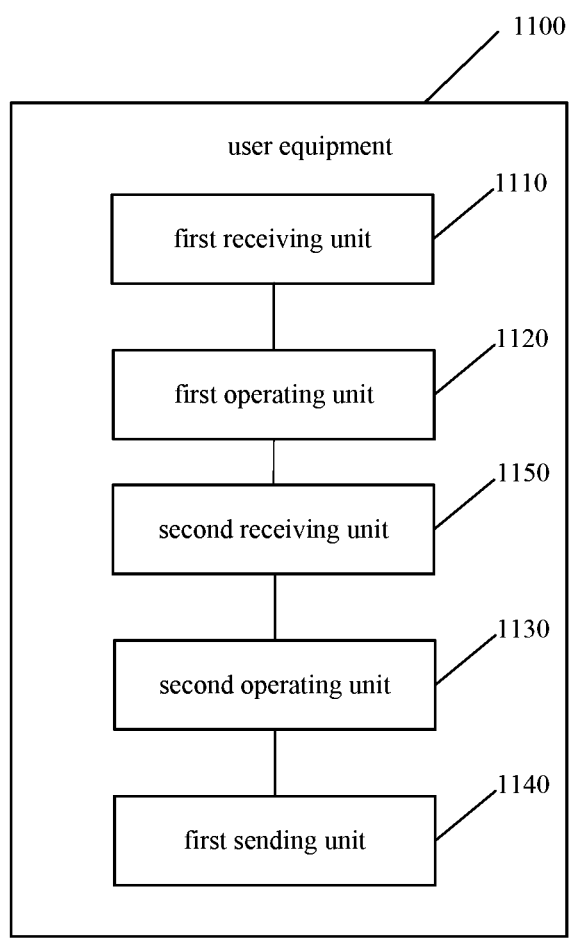
FIG. 15 is a schematic block diagram of user equipment according to another embodiment of the present disclosure.

Optionally, as shown in FIG. 15, the user equipment 1100 further includes:

a second operating unit 1130, configured to operate on a carrier corresponding to the first base station on a particular sub-frame, detect whether third information sent by the first base station exists, and continues to operate on the carrier corresponding to the first base station if the third information exists, wherein the third information is used for instructing the user equipment to operate on the carrier corresponding to the first base station. At this time, the first base station is a macro base station, and the second base station is a micro base station.

Optionally, the second operating unit 1130 is further configured to operate on the carrier corresponding to the second base station on a non-particular sub-frame, if the third information does not exist;

and the user equipment 1100 further includes: a first sending unit 1140, configured to send fifth information to the second base station, wherein the fifth information is used for requesting the second base station to serve the user equipment. At this time, the first base station is a macro base station, and the second base station is a micro base station.

Optionally, as shown in FIG. 15, the user equipment 1110 further includes:

a second receiving unit 1150, configured to receive information used for indicating the particular sub-frame and sent by the first base station;

the second operating unit is specifically configured to operate on the carrier corresponding to the first base station on the particular sub-frame according to the information used for indicating the particular sub-frame, detect whether third information sent by the first base station exists, and continue to operate on the carrier corresponding to the first base station if the third information exists, wherein the third information is used for instructing the user equipment to operate on the carrier corresponding to the first base station. At this time, the first base station is a macro base station, and the second base station is a micro base station.

Figure 16:
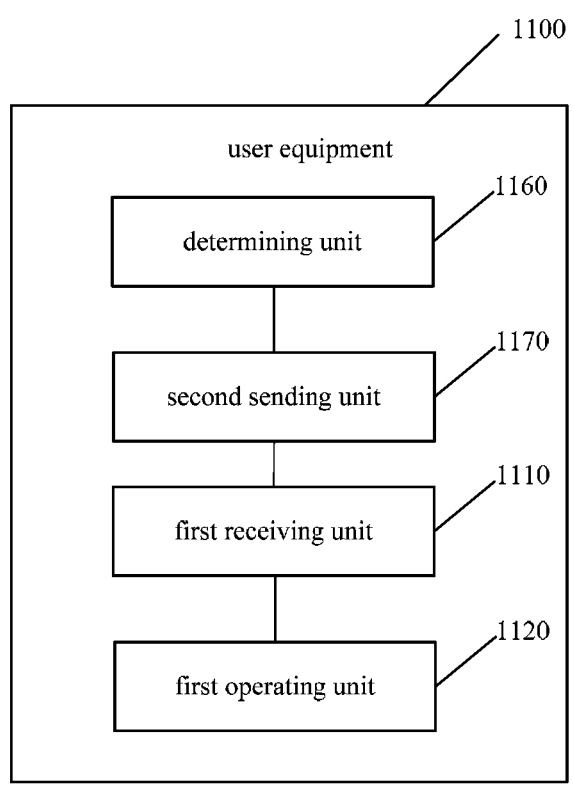
FIG. 16 is a schematic block diagram of user equipment according to another embodiment of the present disclosure.

Optionally, the first information is sent by the first base station to the second base station; as shown in FIG. 16, the user equipment 1110 further includes: a determining unit 1160, configured to determine that an uplink semi-persistent scheduling service needs to be sent to the second base station; and a second sending unit 1170, configured to send fourth information to the first base station, wherein the fourth information is used for requesting for operating on the carrier corresponding to the second base station. At this time, the first base station may be a micro base station, and the second base station may be a macro base station.

Therefore, in the embodiments of the present disclosure, the user equipment receives the second information sent by the first base station, wherein the second information is used for instructing the user equipment to operate on the carrier corresponding to the second base station; and the first base station also sends the first information to the second base station or the second information is sent by the first base station after the first base station receives the first information sent by the second base station, wherein the first information is used for indicating that the second base station is to serve the user equipment, and the user equipment operates on the carrier corresponding to the second base station based on the second information. Accordingly, the user equipment which can not simultaneously operate in cells corresponding to two base stations may operate in a time-sharing manner in a system of multi-carrier polymerization between the base stations, and the time of the user equipment operating in the corresponding cells of the two base stations may be dynamically determined according to actual demand, in order to avoid the problem of reduced user service quality induced when the user equipment operates in a static time-sharing manner; for high-capacity user equipment, due to the interaction between the base stations, the wrong scheduling probability is reduced, and the performance loss caused by wrong scheduling is avoided.

The embodiments are particularly suitable for scenarios in which such services as semi-persistent scheduling service and the like are served by the macro base station for the user equipment. When the macro base station serves the user equipment by adopting such services as uplink semi-persistent scheduling service and the like, the user equipment may be quickly switched to operate under the macro base station, in order to reduce the service delay of the semi-persistent scheduling services.

Figure 17:
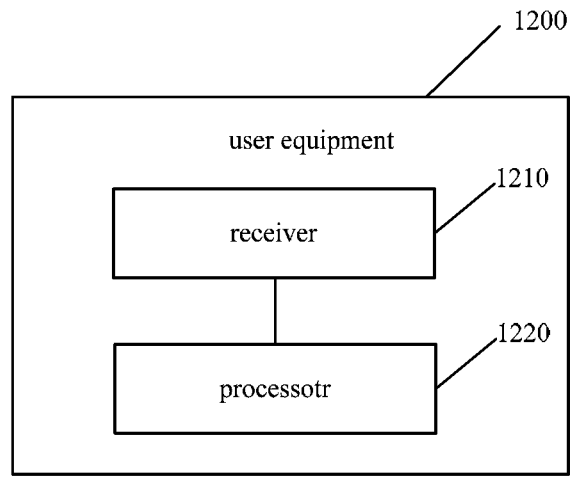
FIG. 17 is a schematic block diagram of user equipment according to another embodiment of the present disclosure.

FIG. 17 is a schematic block diagram of user equipment 1200 according to an embodiment of the present disclosure. As shown in FIG. 17, the user equipment 1200 includes:

a receiver 1210, configured to receive second information sent by a first base station, wherein the second information is used for instructing the user equipment to operate on a carrier corresponding to the second base station; and the first base station also sends first information to the second base station, or the second information is sent by the first base station after the first base station receives the first information sent by the second base station, wherein the first information is used for indicating that the second base station is to serve the user equipment; and a processor 1220, configured to operate on the carrier corresponding to the second base station based on the second information.

Optionally, the first base station and the second base station interact with the user equipment by means of different carriers, and the first base station and the second base station have different divisions of labor for the user equipment.

Optionally, the processor 1220 is further configured to operate on a carrier corresponding to the first base station on a particular sub-frame, and detect whether third information sent by the first base station exists, and continue to operate on the carrier corresponding to the first base station if the third information exists, wherein the third information is used for instructing the user equipment to operate on the carrier corresponding to the first base station, At this time, the first base station is a macro base station, and the second base station is a micro base station.

Figure 18:
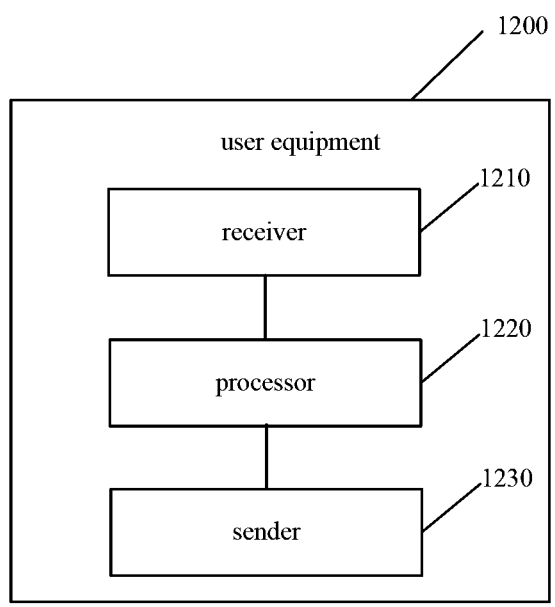
FIG. 18 is a schematic block diagram of user equipment according to another embodiment of the present disclosure.

Optionally, the processor 1220 is further configured to operate on the carrier corresponding to the second base station on a non-particular sub-frame, if the third information does not exist;

and the processor 1220 is further configured to generate fifth information, wherein the fifth information is used for requesting the second base station to serve the user equipment;

as shown in FIG. 18, the user equipment 1100 further includes: a sender 1230, configured to send the fifth information to the second base station. At this time, the first base station is a macro base station, and the second base station is a micro base station.

Optionally, the receiver 1220 is further configured to receive information used for indicating the particular sub-frame and sent by the first base station;

and the processor 1220 is specifically configured to operate on the carrier corresponding to the first base station on the particular sub-frame according to the information used for indicating the particular sub-frame, and detect whether third information sent by the first base station exists, and continue to operate on the carrier corresponding to the first base station if the third information exists, wherein the third information is used for instructing the user equipment to operate on the carrier corresponding to the first base station. At this time, the first base station is a macro base station, and the second base station is a micro base station.

Optionally, the first information is sent by the first base station to the second base station; the processor 1220 is further configured to determine that an uplink semi-persistent scheduling service needs to be sent to the second base station, and configured to instruct the sender 1230 to send fourth information to the first base station, wherein the fourth information is used for requesting for operating on the carrier corresponding to the second base station;

and the sender 1230 is configured to send the fourth information to the first base station according to the indication of the processor 1220. At this time, the first base station may be a micro base station, and the second base station may be a macro base station.

Therefore, in the embodiments of the present disclosure, the user equipment receives the second information sent by the first base station, wherein the second information is used for instructing the user equipment to operate on the carrier corresponding to the second base station; the first base station also sends the first information to the second base station or the second information is sent by the first base station after receiving the first information sent by the second base station, wherein the first information is used for indicating that the second base station is to serve the user equipment, and the user equipment operates on the carrier corresponding to the second base station based on the second information. Accordingly, the user equipment which can not simultaneously operate in cells corresponding to two base stations may operate in a time-sharing manner in a system of multi-carrier polymerization between the base stations, and the time of the user equipment operating in the corresponding cells of the two base stations may be dynamically determined according to actual demand, in order to avoid the problem of reduced user service quality induced when the user equipment operates in a static time-sharing manner; for high-capacity user equipment, due to the interaction between the base stations, the wrong scheduling probability is reduced, and the performance loss caused by wrong scheduling is avoided.

The embodiments are particularly suitable for scenarios in which such services as semi-persistent scheduling service and the like are served by the macro base station for the user equipment. When the macro base station serves the user equipment by adopting such services as uplink semi-persistent scheduling service and the like, the user equipment may be quickly switched to the operate under the macro base station, in order to reduce the service delay of the semi-persistent scheduling services.

It should be understood that, characteristics in the method embodiments of the present disclosure are applicable to equipment embodiments of the present disclosure under proper conditions, and vice versa.

Those of ordinary skills in the art may be aware that, units and algorithm steps of the examples described in the embodiments disclosed in this paper may be implemented by electronic hardware or a combination of computer software and the electronic hardware. Whether these functions are implemented in the form of hardware or software is determined by specific applications and design constraint conditions of the technical solutions. Those skilled may implement the described functions by using different methods for each specific application, but this implementation should not be considered beyond the scope of the present disclosure.

Those skilled in the art to which the present disclosure pertains may clearly understand that, for convenience and concision of description, the specific working processes of the system, apparatus and units described above may refer to corresponding processes in the foregoing method embodiments, and will not be repeated redundantly herein.

In the several embodiments provided in the present application, it should be understood that, the disclosed system, apparatus and method may be implemented in other manners. For example, the apparatus embodiments described above are merely exemplary. For example, the division of the units is only a logic function division, other division manners may exist in practical implementation. For example, multiple units or components may be combined or integrated to another system, or some features may be omitted or not implemented. From another point of view, the displayed or discussed mutual coupling or direct coupling or communication connection may be indirect coupling or communication connection of devices or units through some interfaces, and may be in electrical, mechanical or other forms.

The units described as separate components may be separated physically or not, components displayed as units may be physical units or not, namely, may be located in one place, or may be distributed on multiple network units. A part of or all of the units may be selected to achieve the purposes of the technical solutions in the embodiments according to actual demand.

In addition, the functional units in the embodiments of the present disclosure may be integrated in a processing unit, or the units singly exist physically, or two or more units are integrated in one unit.

If the function is implemented in the form of a software functional unit and is sold or used as an independent product, it may be stored in a computer readable storage medium. Based on this understanding, the technical solutions of the present disclosure substantially, or the part contributing to the prior art, or a part of the technical solutions may be implemented in the form of a software product, wherein the computer software product is stored in a storage medium, and includes multiple instructions enabling a computer device (which may be a personnel computer, a server, or network device, etc.) to execute all or a part of the steps of the methods in the embodiments of the present disclosure. The foregoing storage medium includes a variety of media capable of storing program codes, such as a USB disk, a mobile hard disk, a read-only memory (ROM), a random access memory (RAM), a magnetic disk, an optical disk or the like.

The foregoing descriptions are merely specific embodiments of the present disclosure, rather than to limit the protection scope of the present disclosure. Any skilled one who is familiar with this art could readily think of variations or substitutions within the disclosed technical scope of the present disclosure, and these variations or substitutions shall fall within the protection scope of the present disclosure. Accordingly, the protection scope of the claims should prevail over the protection scope of the present disclosure.

What is claimed is:

1. A base station, comprising:
a receiver, configured to receive first information from a second base station after the second base station determines that a downlink semi-persistent scheduling needs to be sent to a user equipment, wherein the first information indicates that the second base station is to serve the user equipment;
a processor, configured to process the first information; and
a transmitter, configured to send second information to the user equipment according to the first information, wherein the second information is configured to instruct the user equipment to operate on a second carrier, the second carrier corresponding to the second base station;
wherein the base station is configured to interact with the user equipment via a first carrier, and to provide different functionality with respect to the user equipment relative to the second base station;
wherein the transmitter is further configured to send third information to the user equipment, wherein the third information is configured to instruct the user equipment to operate on the first carrier on a particular sub-frame and to continue to operate on the first carrier after the third information is detected; and
wherein the transmitter is further configured to send information that indicates the particular sub-frame to the second base station such that the second base station does not send data to the user equipment on the particular sub-frame, and wherein the second base station is configured to send, after k sub-frames after the first information is sent, physical downlink control channel signaling for triggering a semi-persistent service of the user equipment to the user equipment, wherein k is not smaller than 8+t, and t is an integer greater than or equal to 5.

2. The base station according to claim 1, wherein the transmitter is further configured to send the second information to the second base station.

3. The base station according to claim 1, wherein the receiver is further configured to receive fourth information from the user equipment after the user equipment determines that an uplink semi-persistent scheduling service needs to be sent to the second base station, wherein the fourth information is configured for requesting operation on the second carrier; and
wherein the transmitter is further configured to send the first information to the second base station according to the fourth information received by the receiver.

4. The base station according to claim 1, wherein the transmitter is further configured to send information that indicates the particular sub-frame to the user equipment.

5. A second base station, comprising:
a processor, configured to process information indicating that the second base station is to serve a user equipment, and to serve the user equipment;
a receiver, configured to receive information indicating a particular sub-frame from a first base station; and
wherein the processor is further configured to not send data to the user equipment on the particular sub-frame indicated by the information indicating the particular sub-frame;
wherein the second base station is configured to interact with the user equipment via a a second carrier, and to provide different functionality with respect to the user equipment relative to the first base station;
wherein the receiver is further configured to receive information configured for requesting the second base station to serve the user equipment from the user equipment when the user equipment operates on the second carrier on a sub-frame that is not the particular sub-frame after the user equipment detects that no information configured to instruct the user equipment to operate on a first carrier when operating on the first carrier on the particular sub-frame, the first carrier corresponding to the first base station;
wherein the processor is further configured to determine that a downlink semi-persistent scheduling service needs to be sent to the user equipment;
wherein the second base station further comprises: a transmitter, configured to send the information indicating that the second base station is to serve the user equipment to the first base station after the processor determines that the downlink semi-persistent scheduling service needs to be sent to the user equipment; and
wherein the transmitter is further configured to send, after k sub-frames after the information indicating that the second base station is to serve the user equipment is sent, physical downlink control channel signaling for triggering a semi-persistent service of the user equipment to the user equipment, wherein k is not smaller than 8+t, and t is an integer greater than or equal to 5.

6. The second base station according to claim 5, wherein the second base station further comprises:
a receiver, configured to receive the information indicating that the second base station is to serve the user equipment.

7. A user equipment, comprising:
a receiver, configured to receive, from a first base station, information for instructing the user equipment to operate on a second carrier, the second carrier corresponding to a second base station; and
a processor, configured to operate the user equipment on the second carrier based on the information for instructing the user equipment to operate on the second carrier;
wherein the user equipment is configured to interace with the first base station and the second base station via different carriers, and wherein the first base station and the second base station have different functionality with respect to the user equipment;

wherein the processor is further configured to operate the user equipment on a first carrier corresponding to the first base station on a particular sub-frame, to detect information for instructing the user equipment to operate on the first carrier;

wherein the processor is further configured to operate on the second carrier on a sub-frame that is not the particular subframe if information for instructing the user equipment to operate on the first carrier is not detected; and wherein the user equipment further comprises: a transmitter, configured to send, to the second base station, information configured for requesting the second base station to serve the user equipment, wherein the second base station is configured to determine that a downlink semi-persistent scheduling service needs to be sent to the user equipment, send information indicating that the second base station is to serve the user equipment to the first base station after determining that the downlink semi-persistent scheduling service needs to be sent to the user equipment, and send, after k sub-frames after the information indicating that the second base station is to serve the user equipment is sent, physical downlink control channel signaling for triggering a semi-persistent service of the user equipment to the user equipment, wherein k is not smaller than 8+t, and t is an integer greater than or equal to 5.

\* \* \* \* \*